United States Patent [19]

Maeda

[11] 4,378,487
[45] Mar. 29, 1983

[54] ELECTRONICALLY CONTROLLED COOKING APPARATUS

[75] Inventor: Masahiko Maeda, Kusatsu, Japan

[73] Assignee: Sanyo Electric Co., Ltd., Moriguchi, Japan

[21] Appl. No.: 236,197

[22] Filed: Feb. 20, 1981

Related U.S. Application Data

[63] Continuation of Ser. No. 19,149, Mar. 9, 1979, abandoned.

[51] Int. Cl.$^3$ ............................................. H05B 6/68
[52] U.S. Cl. ............................. 219/506; 219/10.55 B; 219/10.55 C; 340/588
[58] Field of Search .................. 219/10.55 B, 10.55 R, 219/10.55 M, 506, 492, 10.55 C; 126/197; 340/588, 593, 644, 645; 235/61 A

[56] References Cited

U.S. PATENT DOCUMENTS

| | | | |
|---|---|---|---|
| 3,932,723 | 1/1976 | Tamano et al. | 219/10.55 B |
| 3,974,472 | 8/1976 | Gould, Jr. | 219/506 X |
| 3,978,306 | 8/1976 | Mori | 219/10.55 B |
| 4,001,536 | 1/1977 | Eberhardt, Jr. | 219/10.55 B |
| 4,093,841 | 6/1978 | Dills | 219/10.55 B |
| 4,101,750 | 7/1978 | Doner | 219/10.55 D X |
| 4,158,759 | 6/1979 | Mason | 219/10.55 B |

FOREIGN PATENT DOCUMENTS 2753405 6/1978 Fed. Rep. of Germany ... 219/10.55 B

OTHER PUBLICATIONS

Ad Brochure, Toshiba ER-798 BT, the Touch Control Programmable Microwave Oven, on Sale 5-77.
Microwave Oven Control Manual, by Texas Instruments Inc. © 1976.

Primary Examiner—Arthur T. Grimley
Attorney, Agent, or Firm—Darby & Darby

[57] ABSTRACT

The present invention discloses an electronically controlled cooking apparatus which comprises at least heating energy supply means, cooking completion time setting means, cooking temperature setting means and control means for controlling said heating energy supply means according to the contents preset by said cooking completion time setting means and said cooking temperature setting means, whereby, when both the cooking completion time and cooking temperature are being preset, said control means operates so as to cause said heating energy supply means to start supplying energy automatically at a suitable time.

19 Claims, 47 Drawing Figures

Fig. 1
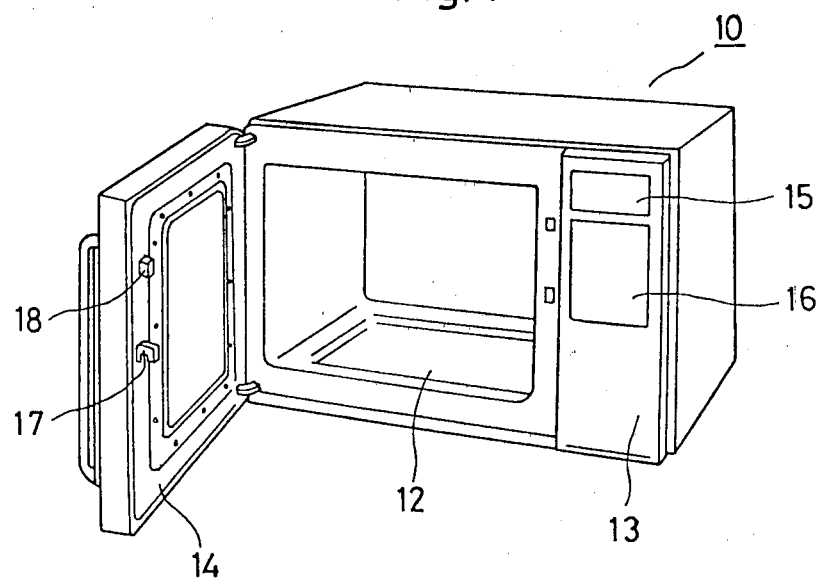
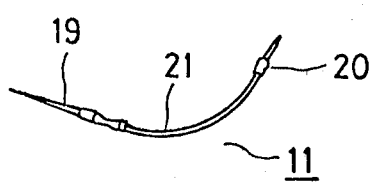

| Key | | | Coded Key Signal Y1 Y2 Y4 |
|---|---|---|---|
| 1 | 0 | START | 0 0 1 |
| 2 | CLEAR | TEMP | 0 1 0 |
| 3 | DELAY START | STOP | 0 1 1 |
| 4 | 7 | TIMER | 1 0 0 |
| 5 | 8 |  | 1 0 1 |
| 6 | 9 | CLOCK | 1 1 0 |

Fig. 6-B

| Key | | Internal code |
|---|---|---|
| 0 |  | 0 0 0 0 |
| 1 | START | 0 0 0 1 |
| 2 | TEMP | 0 0 1 0 |
| 3 | STOP | 0 0 1 1 |
| 4 | TIMER | 0 1 0 0 |
| 5 |  | 0 1 0 1 |
| 6 | CLOCK | 0 1 1 0 |
| 7 |  | 0 1 1 1 |
| 8 | CLEAR | 1 0 0 0 |
| 9 | DELAY START | 1 0 0 1 |

Fig.11-A

| PAGE | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | CND | | FLG2 | FLG1 | CNT3 | CNT2 | | | | | CNT1 | | CLOCK | | | |
| 1 | BL | DP | RF | SB | SF | TEMP B | | | | | STGB | CTLB | TIMEB | | | |
| 2 | FKB | NKB | CF | | TEMP | | | | | | STG1 | CTL1 | TIME 1 | | | |
| 3 | | | | | | | TEMPM | | | | | | | | | |
| 4 | | | | DLYB | AMEND | | | | DELAY TIME | | | | DELAY TIMEB | | | |

DIGIT ADDRESS
104

Fig.11-B

|  | 3 | 2 | 1 | 0 |
|---|---|---|---|---|
| FLG1 | FL | SEC | | |
| FLG2 | | | INT | BSY |
| CND | FLI | | | |
| SB | CLK | SNSR | DOOR | |
| CTL | CK | CD | TP | |

|  | 3 | 2 | 1 | 0 |
|---|---|---|---|---|
| SF | NE | | TPF | TMF |
| CF | KE | NOP | NK | FK |
| RF | | | ZS | MIS |
| STG | DLY | | | |

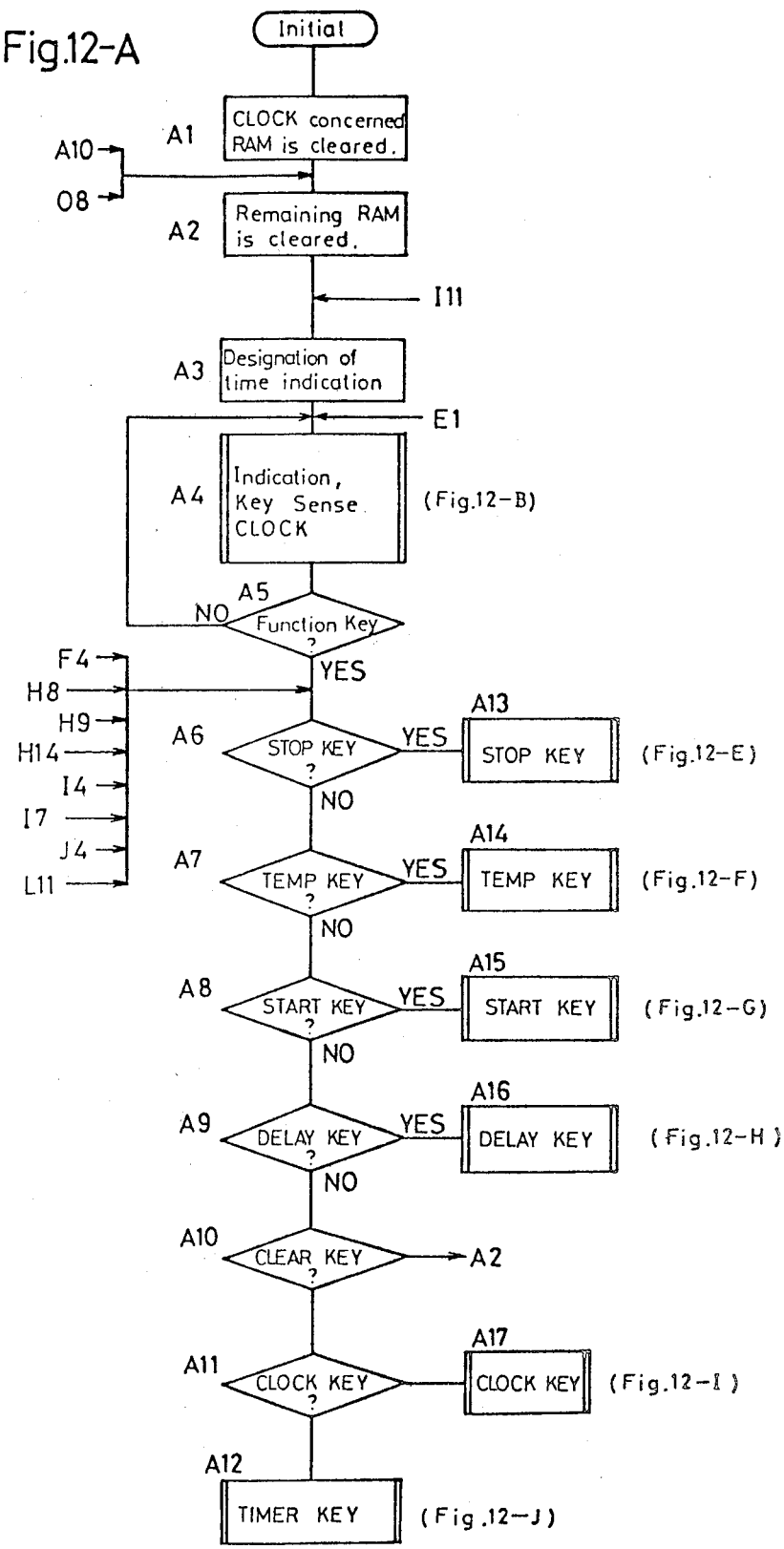
Fig.12-A

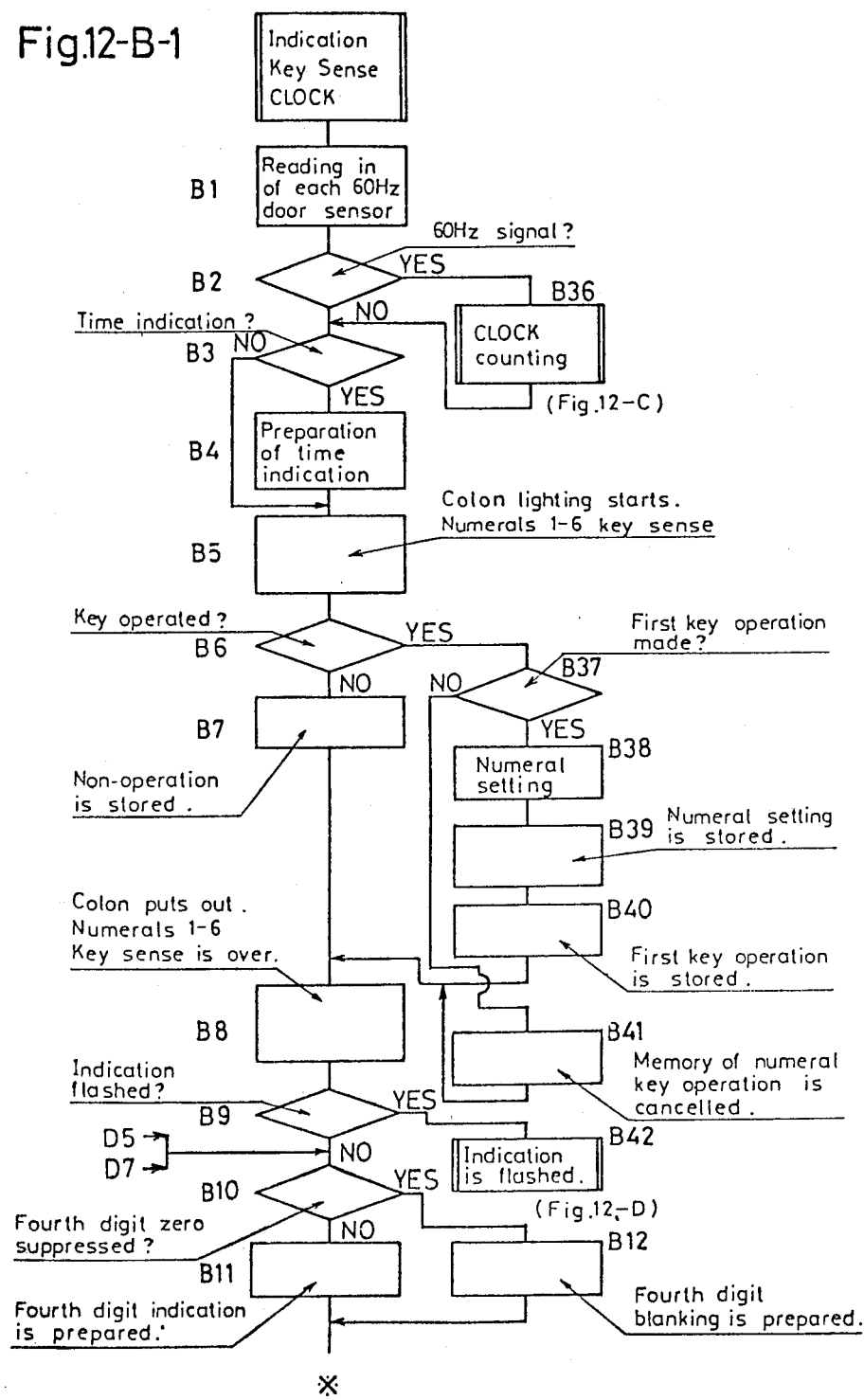

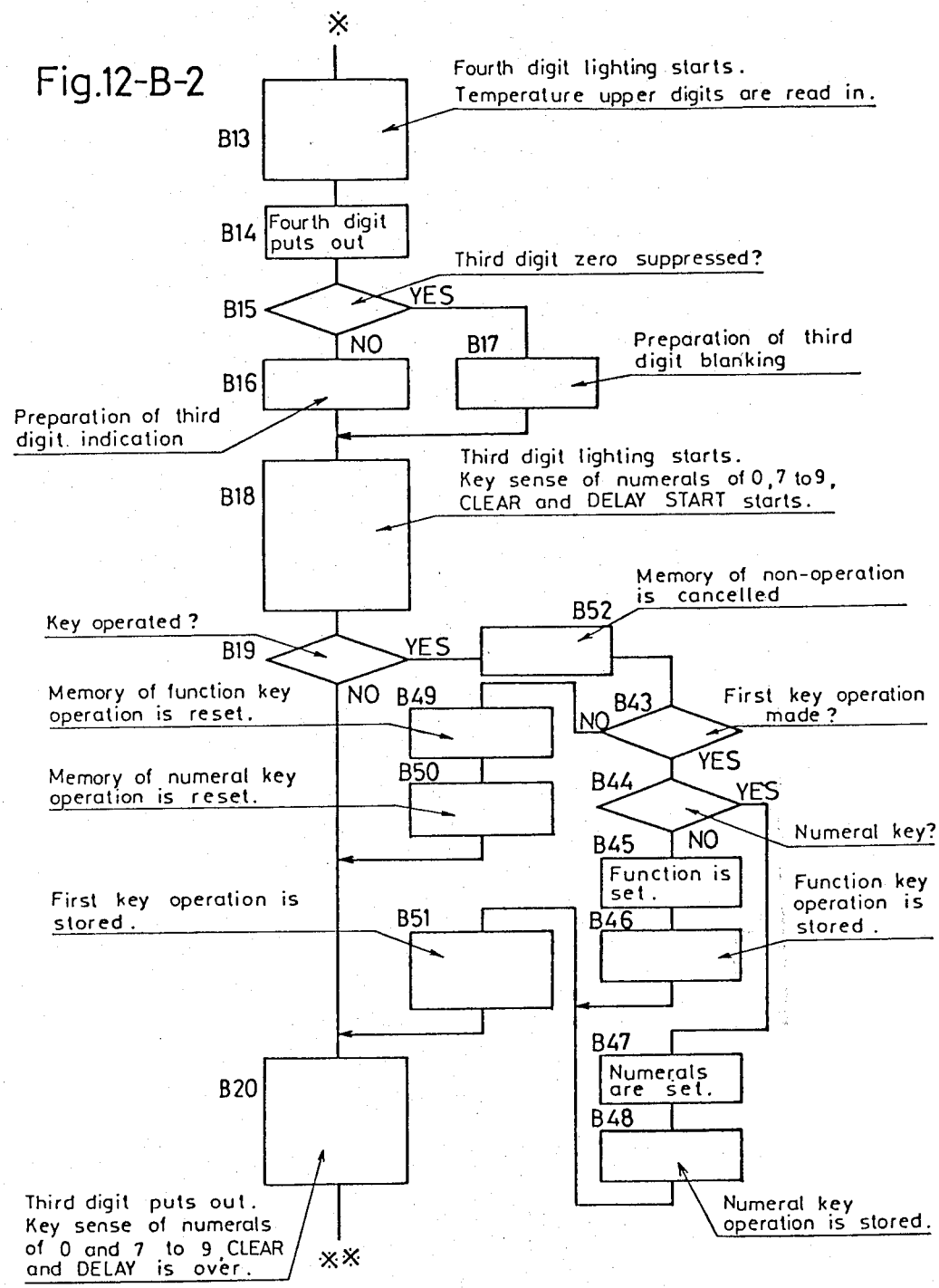

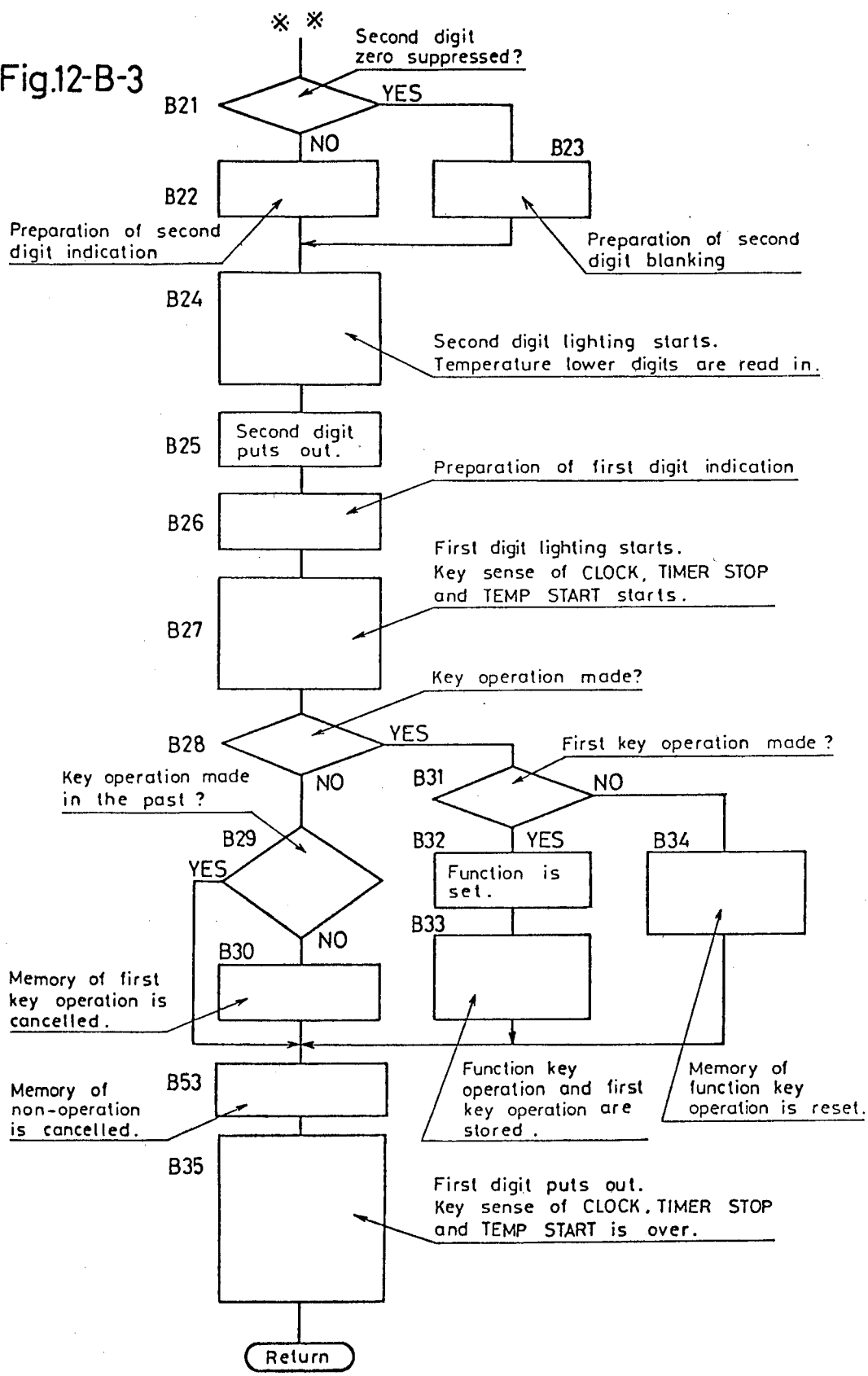
Fig.12-B-3

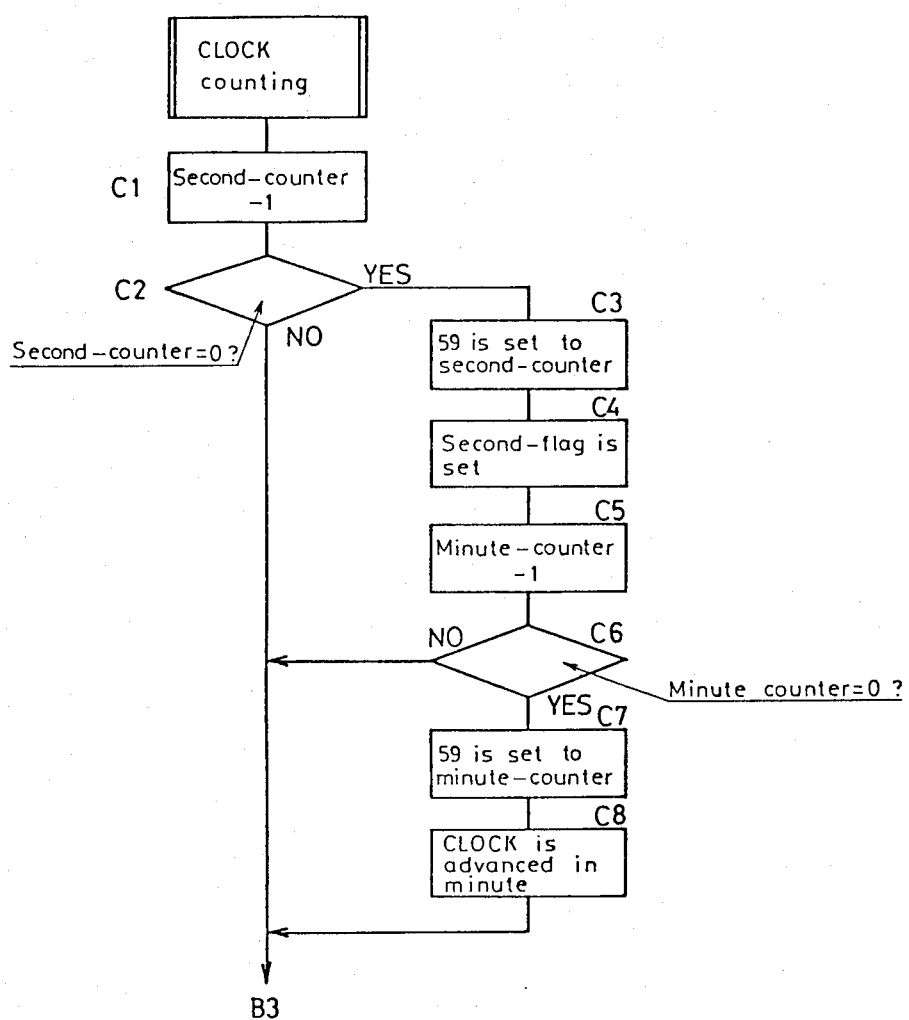
Fig.12-C

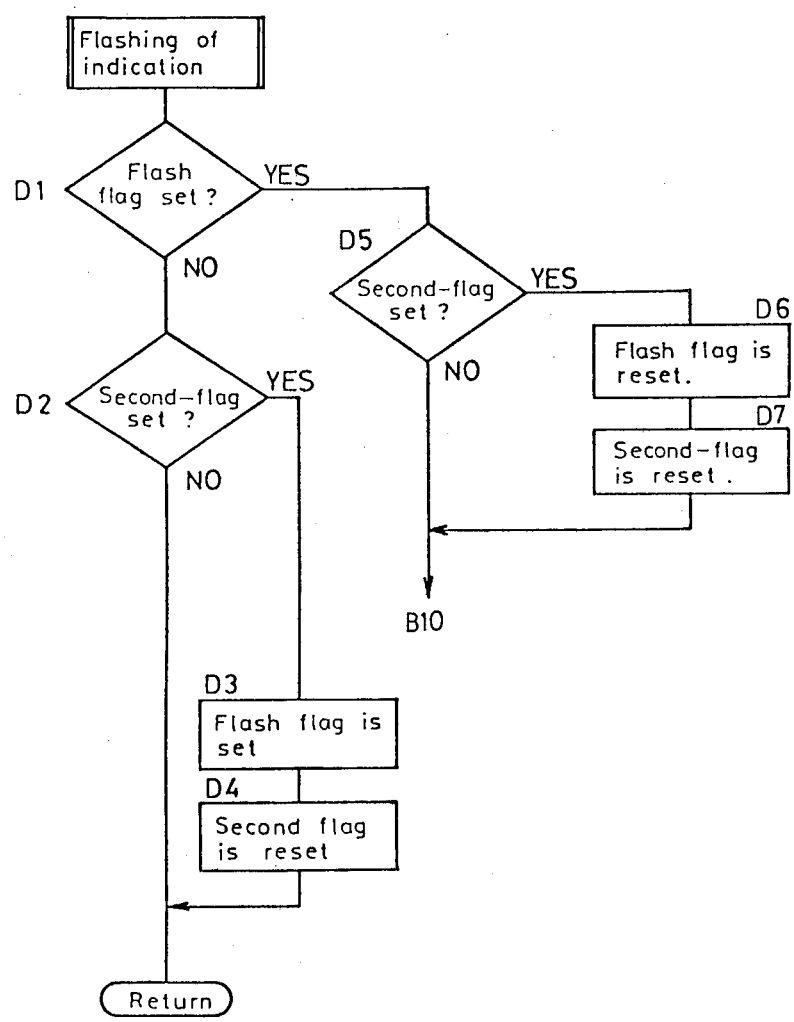
Fig.12-D

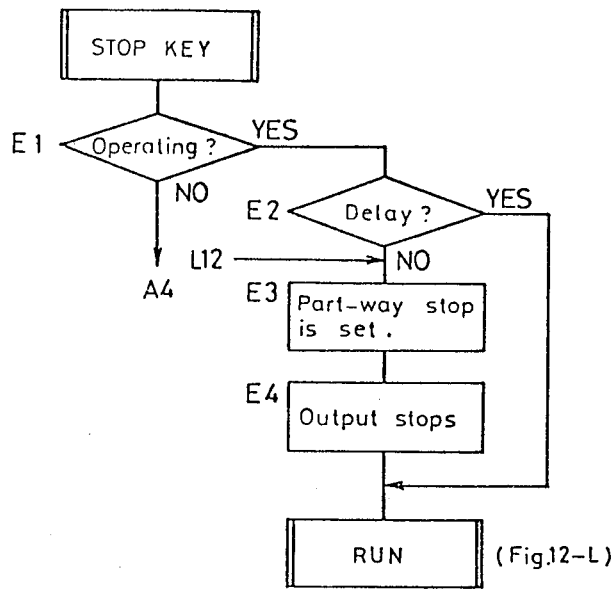
Fig.12-E
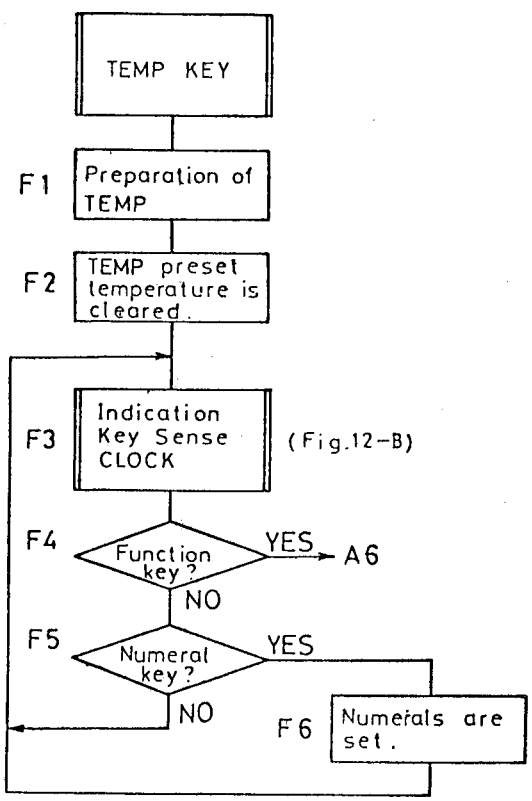
Fig.12-F

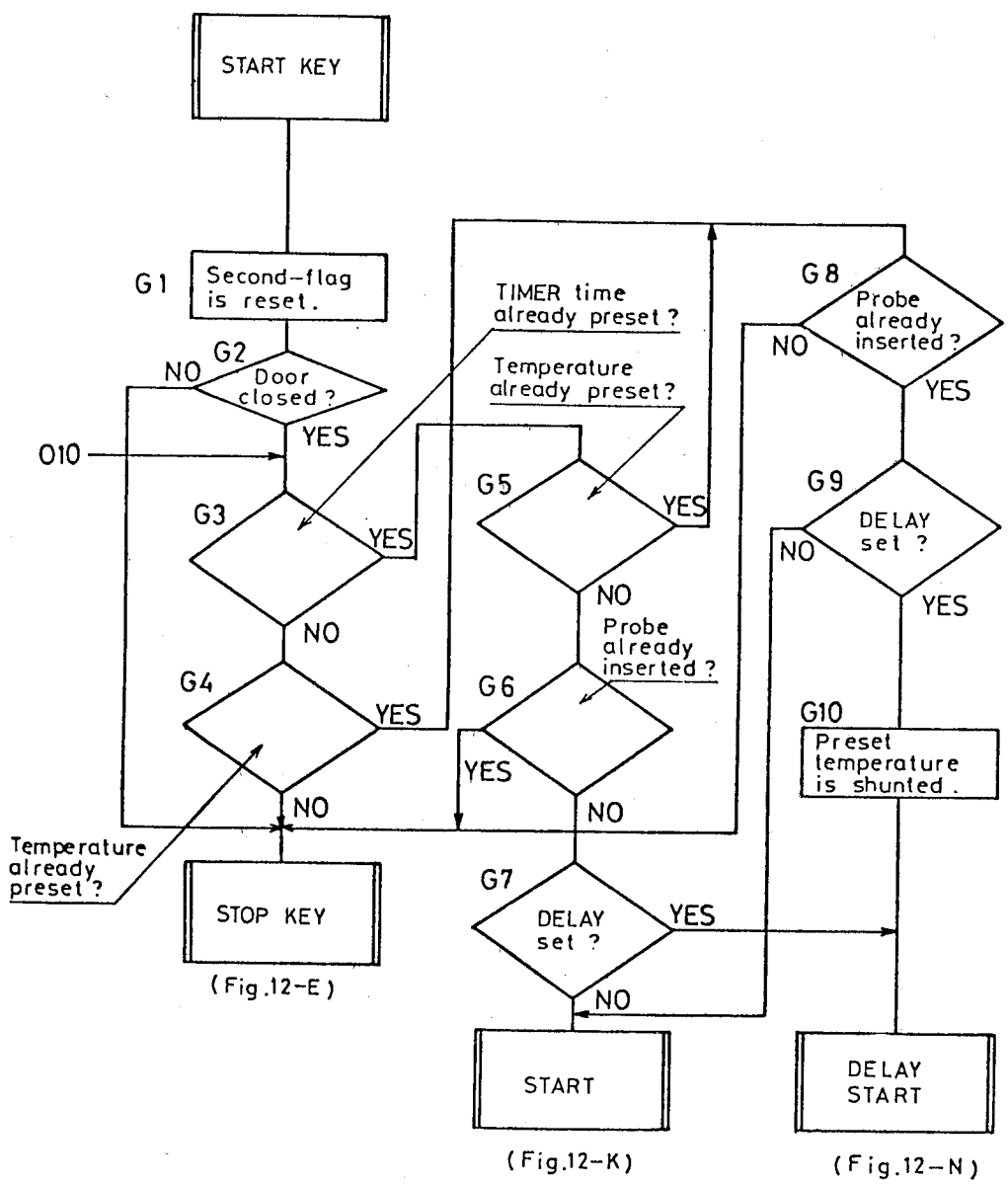
Fig.12-G

Fig.12-H
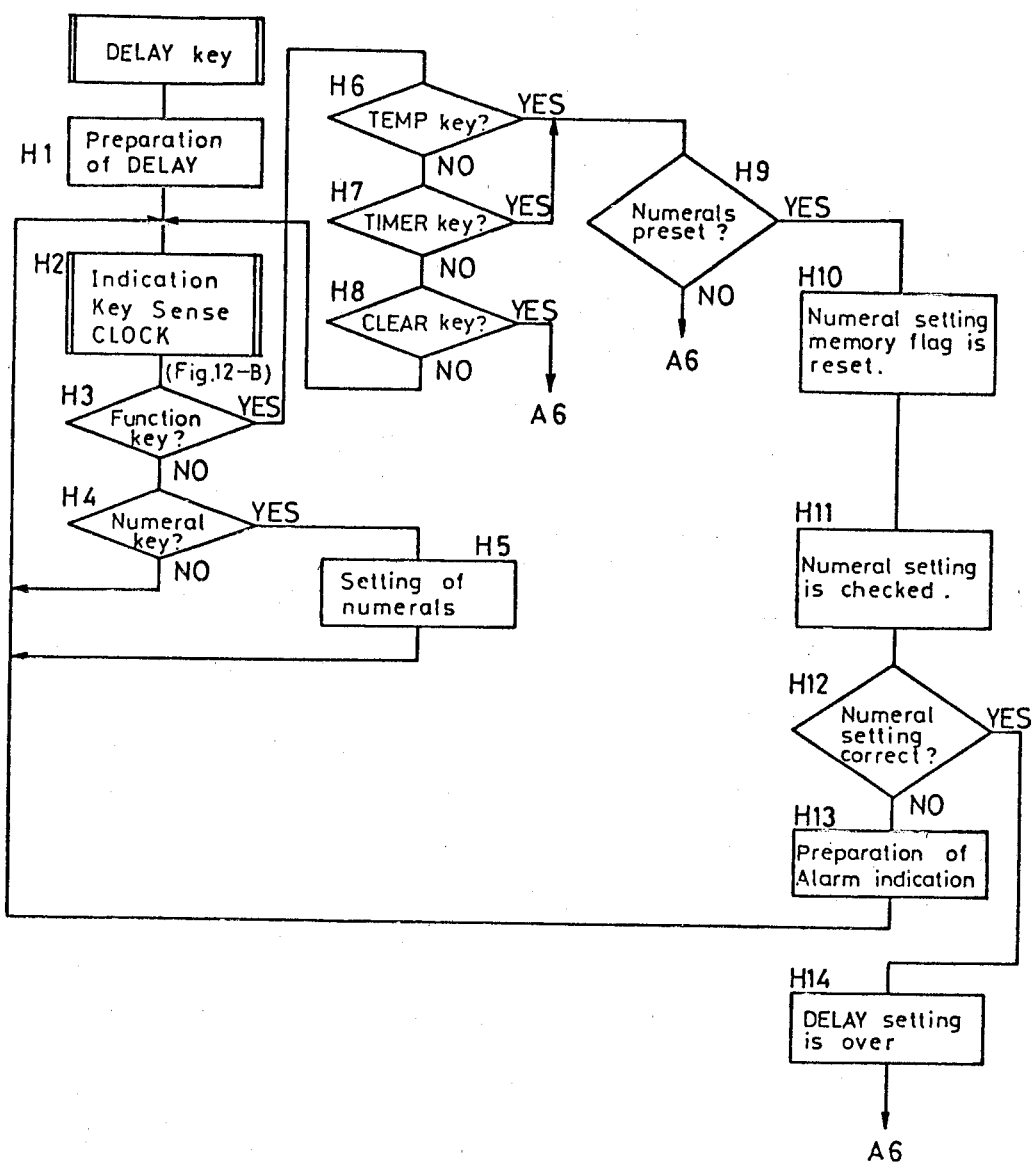

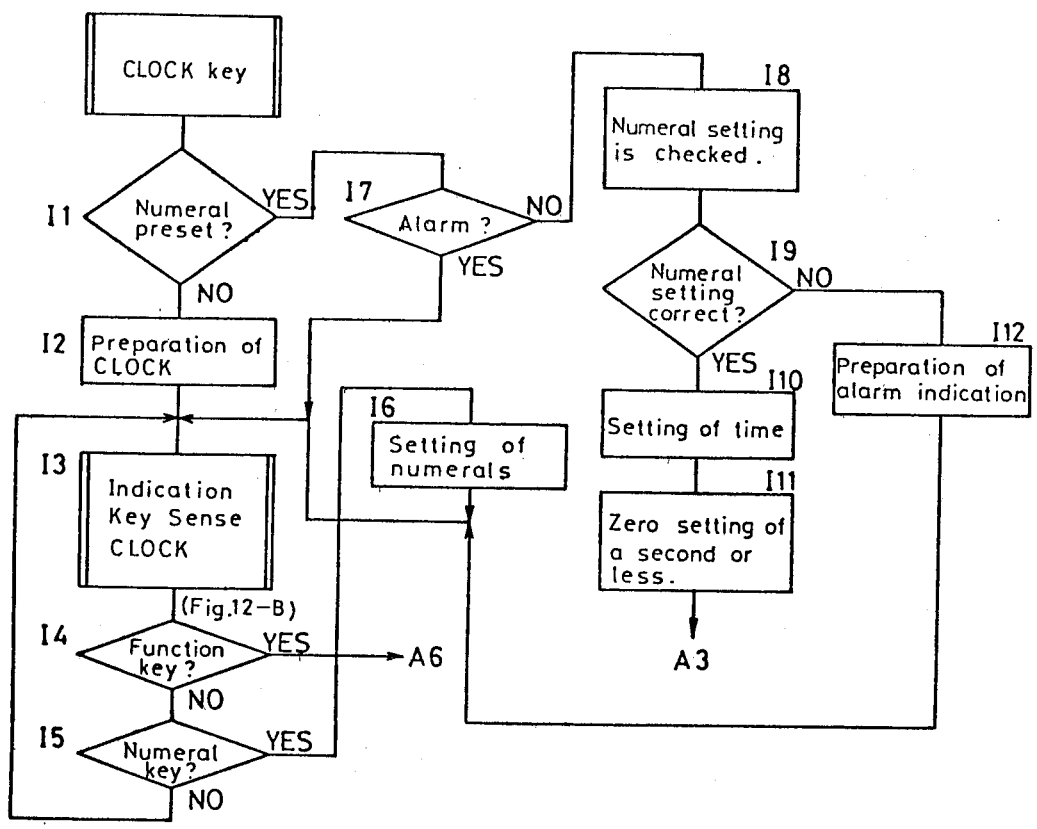
Fig.12-I

Fig.12-J
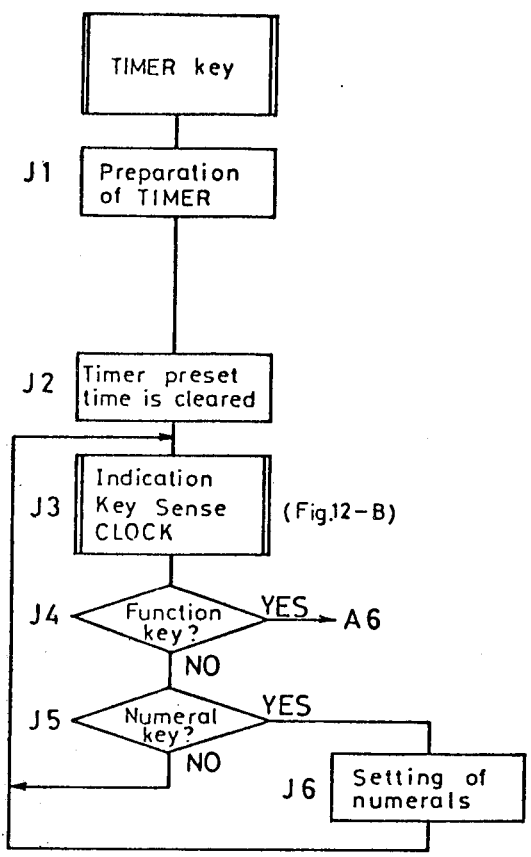
Fig.12-K
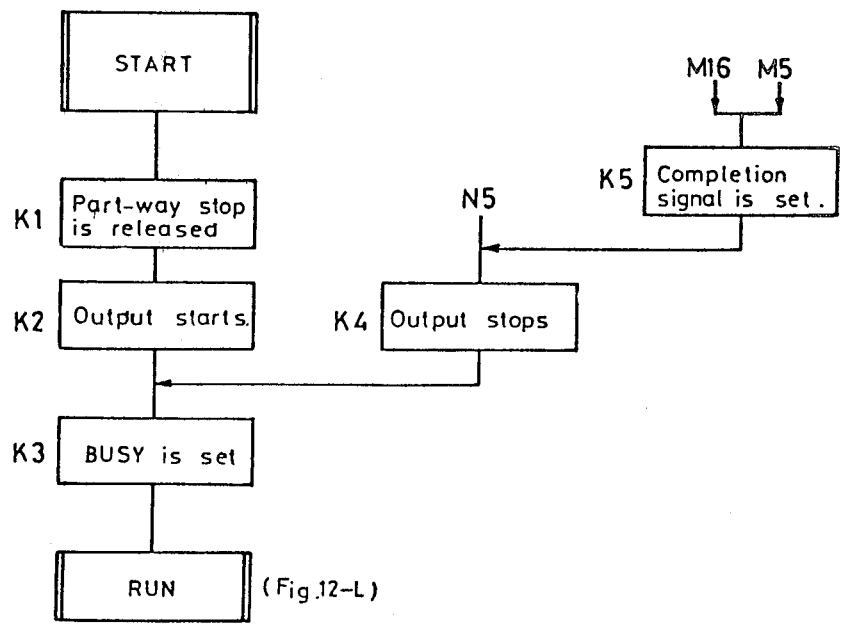

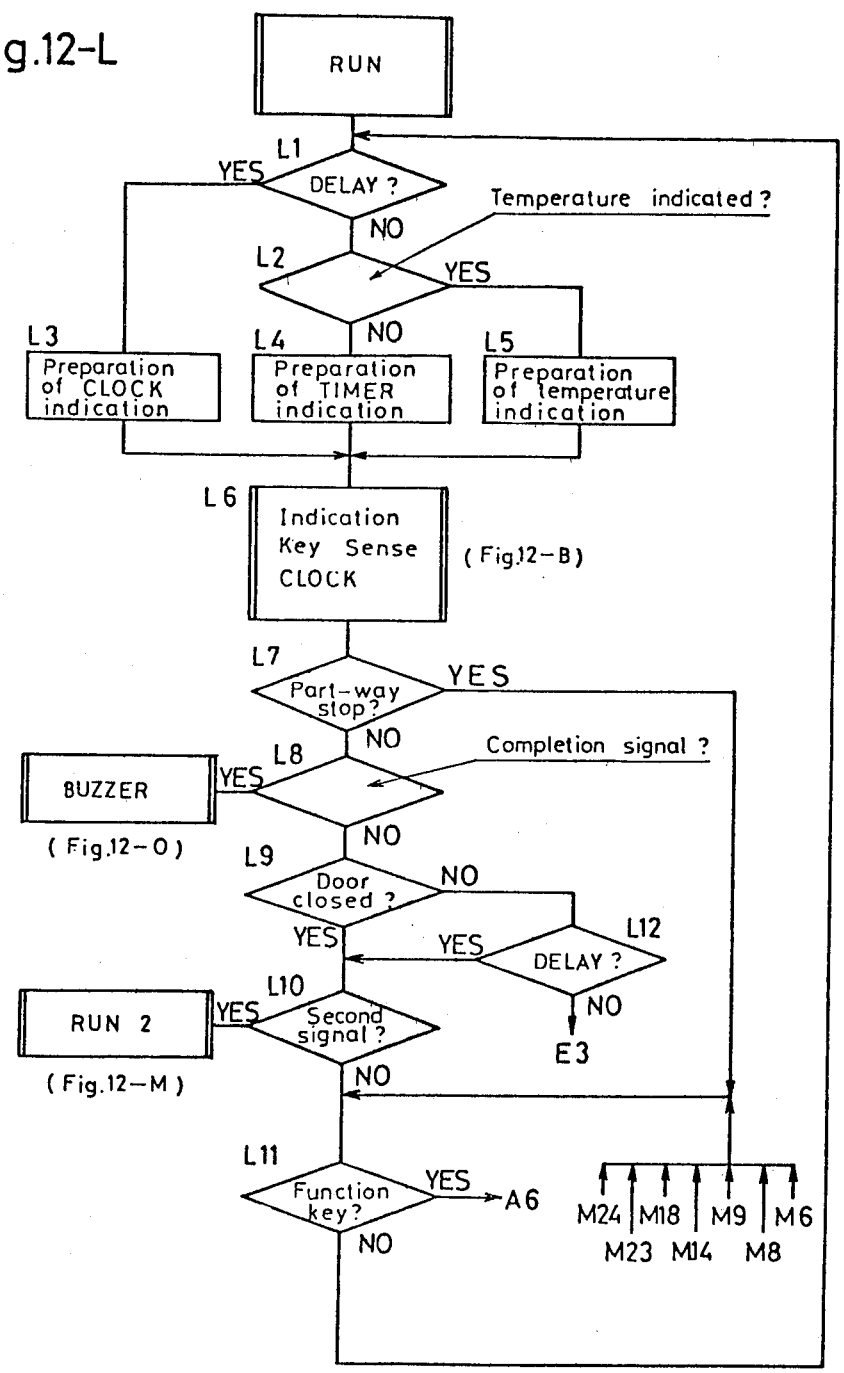

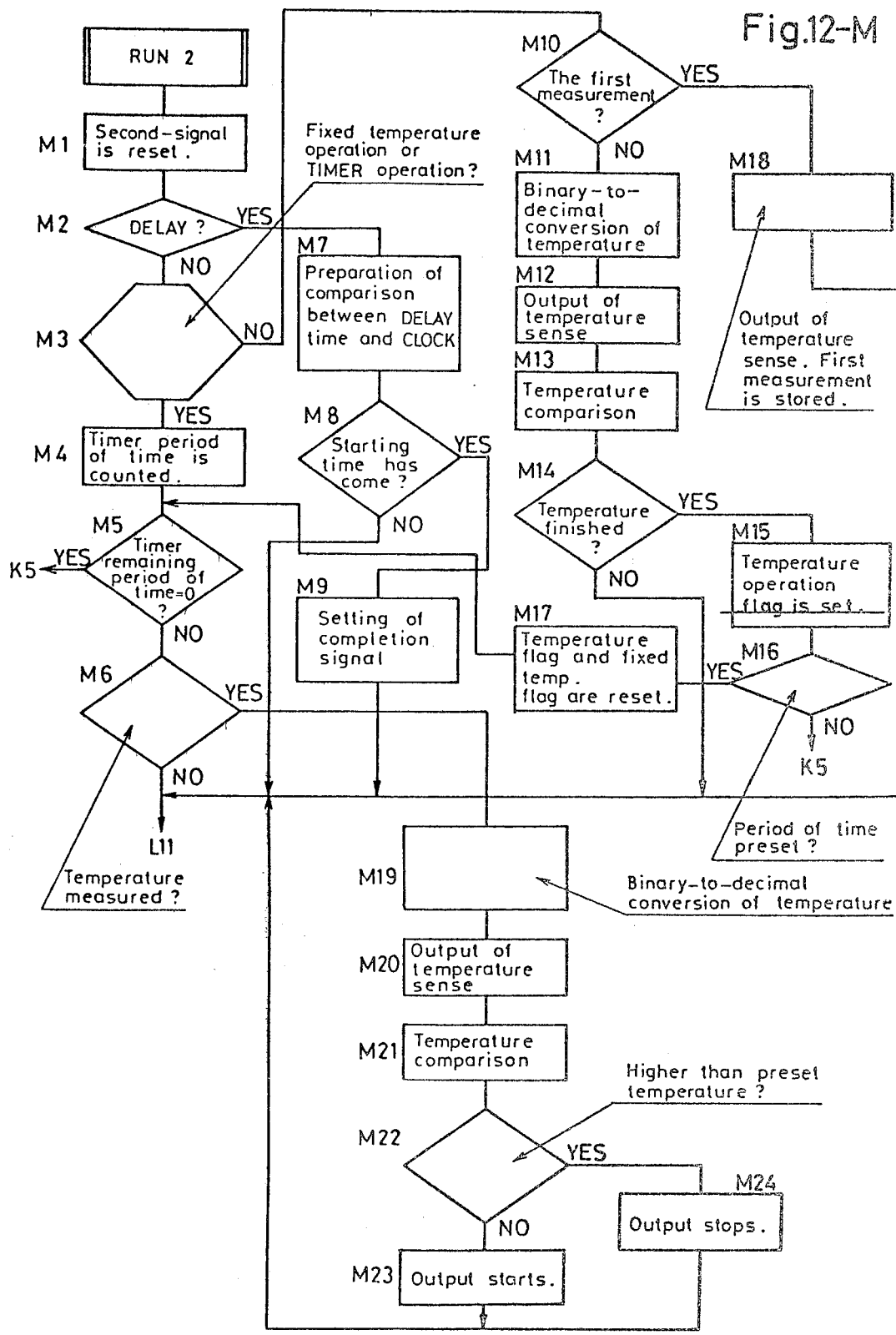

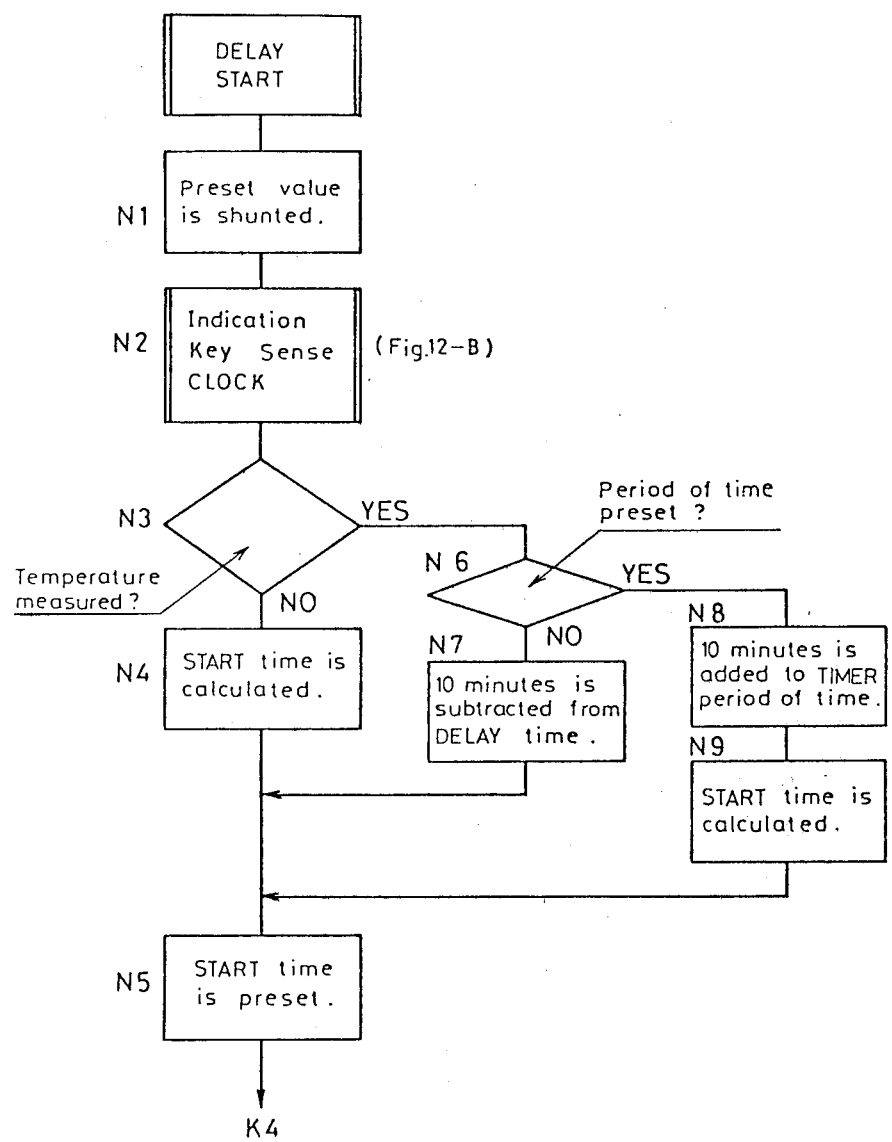
Fig.12-N

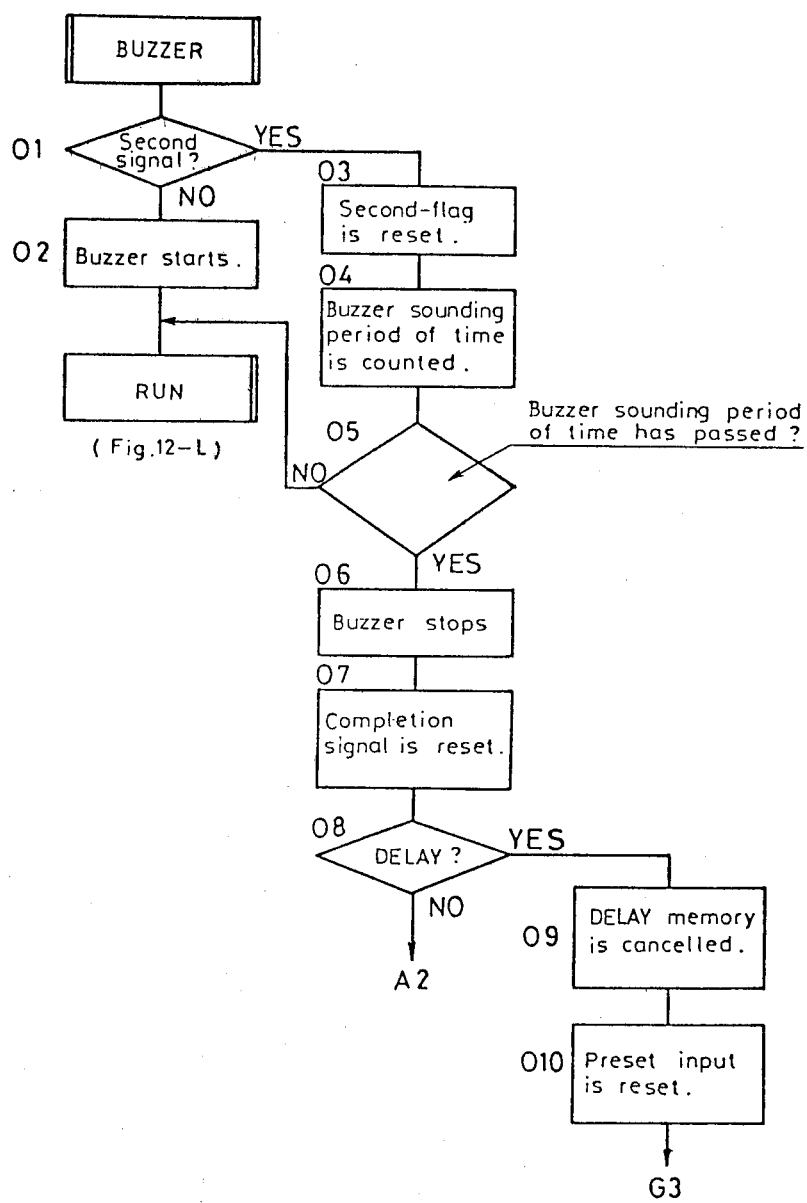

Fig.13-A

| Step | Instruction | Step | Instruction |
|---|---|---|---|
| A1 | P(0,0~9)←0 | A13 | Ⓔ1 |
| A2 | P(0,10~15)←0<br>P(1~4, 0~15)←0 | A14 | Ⓕ1 |
| A3 | CK←1, BL←0, DP←4<br>CD←1 | A15 | Ⓖ1 |
| | | A16 | Ⓗ1 |
| A4 | Ⓑ1 | A17 | Ⓘ1 |
| A5 | FK=0 : Ⓐ4<br>FK=1 : Ⓐ6 | | |
| A6 | FKB = 0011 : Ⓐ13<br>FKB ≠ 0011 : Ⓐ7 | | |
| A7 | FKB = 0010 : Ⓐ14<br>FKB ≠ 0010 : Ⓐ8 | | |
| A8 | FKB = 0001 : Ⓐ15<br>FKB ≠ 0001 : Ⓐ9 | | |
| A9 | FKB = 1001 : Ⓐ16<br>FKB ≠ 1001 : Ⓐ10 | | |
| A10 | FKB = 1000 : Ⓐ2<br>FKB ≠ 1000 : Ⓐ11 | | |
| A11 | FKB = 0110 : Ⓐ17<br>FKB ≠ 0110 : Ⓐ12 | | |
| A12 | Ⓙ1 | | |

Fig.13-B-1

| Step | Instruction | Step | Instruction |
|---|---|---|---|
| B1 | 1. (R5) ← 1<br>2. (K1~K8) → SB<br>3. (R5) ← 0 | B15 | ZS=0 : (B16)<br>ZS=1 :<br>　P(1,(DP-2))=0 : (B17)<br>　P(1,(DP-2))≠0 : (B16) |
| B2 | CLK=1 : (B36)<br>CLK=0 : (B3) | B16 | 1. P(1,(DP-2))←(O), ZS←1<br>2. B18 |
| B3 | CK=1 : (B4)<br>CK=0 : (B5) | B17 | 1. (O)←0, ZS←1<br>2. (B18) |
| B4 | (O4)←1<br>DLYB=1<br>or CD=1 } : CLOCK→TIMEB | B18 | (R2)←1<br>(K1~K8) → (ACC) |
| B5 | (R4)←1<br>(K1~K8) →(ACC) | B19 | (ACC)=0 : (B20)<br>(ACC)≠0 : (B52) |
| B6 | (ACC)=0 →(B7)<br>(ACC)≠0 →(B37) | B20 | 1. To count for a fixed period of time<br>2. (R2)←0, (O)←0 |
| B7 | NOP←1 | B21 | ZS=1 : (B22)<br>ZS=0 :<br>　P(1,(DP-3))=0 : (B23)<br>　P(1,(DP-3))≠0 : (B22) |
| B8 | 1. To count for a fixed period of time<br>2. (R4)←0, ZS←0<br>　(O)←0 | B22 | 1. P(1,(DP-3))←(O)<br>2. (B24) |
| B9 | FL=0 : (B10)<br>FL=1 : (B42) | B23 | 1. (O)←0<br>2. (B23) |
| B10 | BL=1 : (B12)<br>BL=0 :<br>　P(1,(DP-1))=0 : (B12)<br>　P(1,(DP-1))≠0 : (B11) | B24 | (R1)←1<br>(K1~K8) → TEMPM(1) |
|  |  | B25 | 1. To count for a fixed period of time<br>2. (R1)←0  (O)←0 |
| B11 | 1. P(1,(DP-1))←(O)<br>2. (B13) | B26 | P(1,(DP-4)) ← (O) |
| B12 | 1. (O)←0, ZS←1<br>2. (B13) | B27 | (RO)←1<br>(K1~K8) → (ACC) |
| B13 | 1. (R3)←1<br>2. (K1~K8) → TEMPM(2) | B28 | (ACC)=0 : (B29)<br>(ACC)≠0 : (B31) |
| B14 | 1. To count for a fixed period of time<br>2. (R3)←0<br>　(O)←0 | B29 | NOP=0 : (B35)<br>NOP=1 : (B30) |
|  |  | B30 | 1. KE←0<br>2. (B53) |

Fig.13-B-2

| Step | Instruction | Step | Instruction |
|---|---|---|---|
| B31 | KE=0 : (B32)<br>KE=1 : (B34) | B46 | 1. FK←1<br>2. (B51) |
| B32 | (ACC) → FKB | B47 | (ACC) → NKB |
| B33 | 1. FK←1, KE←1<br>2. (B53) | B48 | 1. NK←1<br>2. (B51) |
| B34 | 1. FK←0<br>2. (B53) | B49 | FK←0 |
| B35 | 1. To count for a fixed period of time<br>2. (RO)←0, (O)←0 | B50 | 1. NK←0<br>2. (B20) |
|   |   | B51 | 1. KE←1<br>2. (B20) |
| B36 | (C1) | B52 | 1. NOP←0  2. (B43) |
| B37 | KE=0 : (B37)<br>KE=1 : (B41) | B53 | 1. NOP←0  2. (B35) |
| B38 | (ACC) → NKB |   |   |
| B39 | NK←1 |   |   |
| B40 | 1. KE←1<br>2. (B8) |   |   |
| B41 | 1. NK←0<br>2. (B8) |   |   |
| B42 | D1 |   |   |
| B43 | KE=0 : (B44)<br>KE=1 : (B49) |   |   |
| B44 | (ACC)=000,100<br>    101or110:(B47)<br>(ACC)=010or011:(B45) |   |   |
| B45 | (ACC) → FKB |   |   |

Fig.13-C

| Step | Instruction |
|---|---|
| C1 | CNT1−1 → (ACC) |
| C2 | (ACC)=0 : ⓒ3<br>(ACC)≠0 :<br>  1. (ACC) → CNT1<br>  2. Ⓑ3 |
| C3 | CNT1 ← 59 |
| C4 | SEC ← 1 |
| C5 | CNT2 −1 → (ACC) |
| C6 | (ACC)=0 : ⓒ7<br>(ACC)≠0 :<br>  1. (ACC) → CNT2<br>  2. Ⓑ3 |
| C7 | CNT2 ← 59 |
| C8 | 1. CLOCK +1 → CLOCK<br>2. Ⓑ3 |

Fig.13-D

| Step | Instruction |
|---|---|
| D1 | FLI = 1 : Ⓓ5<br>FLI = 0 : Ⓓ2 |
| D2 | SEC = 1 : Ⓓ3<br>SEC = 0 : Return |
| D3 | FLI ← 1 |
| D4 | 1. SEC ← 0<br>2. Return |
| D5 | SEC = 1 : Ⓓ6<br>SEC = 0 : Ⓑ10 |
| D6 | FLI ← 0 |
| D7 | 1. SEC ← 0<br>2. Ⓑ10 |

Fig.13-E

| Step | Instruction |
|---|---|
| E1 | BSY = 0 : Ⓐ4<br>BSY = 1 : Ⓔ2 |
| E2 | DLYB = 1 : Ⓛ1<br>DLYB = 0 : Ⓔ3 |
| E3 | INT ← 1 |
| E4 | 1. (R8) ← 0<br>2. Ⓛ1 |

Fig.13-F

| Step | Instruction |
|---|---|
| F1 | CK←0, BL←1, DP←11 |
| F2 | TEMPB ← 0 |
| F3 | (B1) |
| F4 | FK = 0 : (F5)<br>FK = 1 : (A6) |
| F5 | NK = 0 : (F3)<br>NK = 1 : (F6) |
| F6 | 1. NKB → TEMPB (1)<br>TEMPB is shifted to the left by on digit.<br>TPF←1<br>2. (F3) |

Fig.13-G

| Step | Instruction | Step | Instruction |
|---|---|---|---|
| G1 | SEC ← 0 | G8 | SNSR = 0 : (E1)<br>SNSR = 1 : (G9) |
| G2 | DOOR = 1 : (G3)<br>DOOR = 0 : (E1) | G9 | DLYB = 0 : (K1)<br>DLYB = 1 : (G10) |
| G3 | TMF = 0 : (G4)<br>TMF = 1 : (G5) | G10 | 1. TEMPB → TEMP<br>2. (N1) |
| G4 | TPF = 0 : (E1)<br>TPF = 1 : (G8) | | |
| G5 | TPF = 0 : (G6)<br>TPF = 1 : (G8) | | |
| G6 | SNSR = 1 : (E1)<br>SNSR = 0 : (G7) | | |
| G7 | DLYB = 0 : (K1)<br>DLYB = 1 : (N1) | | |

Fig.13-H

| Step | Instruction | Step | Instruction |
|---|---|---|---|
| H1 | CK ← 1, DLY ← 1, CD ← 0<br>TIMEB ← 0, DP ← 4 | H10 | NE ← 0 |
| H2 | (B1) | H11 | TIMEB (4,3) = 0<br>TIMEB (4) > 0001,<br>{TIMEB(4)=0001, TIMEB(3)>0010}<br>or TIMEB(2) > 0101<br>: MIS ← 1 |
| H3 | FK = 0 : (H4)<br>FK = 1 : (H6) | | |
| H4 | NK = 0 : (H3)<br>NK = 1 : (H5) | H12 | MIS = 0  (H14)<br>MIS = 1  (H13) |
| H5 | 1. NKB → TIMEB(1)<br>TIMEB is shifted to the left by on digit.<br>NE ← 1<br>2. (H2) | H13 | 1. FL ← 1<br>2. (H2) |
| | | H14 | 1. TIMEB → DELAY TIME<br>DLY → DLYB<br>2. (A6) |
| H6 | FKB = 0010 : (H9)<br>FKB ≠ 0010 : (H7) | | |
| H7 | FKB = 0100 : (H9)<br>FKB ≠ 0100 : (H8) | | |
| H8 | FKB = 1000 : (A6)<br>FKB ≠ 1000 : (H2) | | |
| H9 | NE = 1 : (H10)<br>NE = 0 : (A6) | | |

Fig.13-I

| Step | Instruction |
|---|---|
| I1 | NE=1 : (I7)<br>NE=0 : (I2) |
| I2 | CK←1, TIMEB←0<br>BL←0, DP←4, CD←0 |
| I3 | (B1) |
| I4 | FK=1 : (H6)<br>FK=0 : (I5) |
| I5 | NK=1 : (I6)<br>NK=0 : (I3) |
| I6 | 1. NE←1<br>   NKB→TIMEB (1)<br>   TIMEB is shifted to the<br>   left by on digit.<br>2. (I3) |
| I7 | FL=1 : (A6)<br>FL=0 : (I8) |
| I8 | TIMEB(4,3)=0<br>TIMEB(4)>0001<br>{TIMEB(4)=0001,TIMEB(3)>0010}<br>or TIMEB(2)>0101<br>: MIS←1 |
| I9 | MIS=0 : (I10)<br>MIS=1 : (I12) |
| I10 | TIMEB←CLOCK<br>NE←0 |
| I11 | 1. CNT1←59<br>   CNT2←59<br>2. (A3) |
| I12 | 1. FL←1<br>2. (I3) |

Fig.13-J

| Step | Instruction |
|---|---|
| J1 | CK←0, DP←4, BL←0<br>CD←0 |
| J2 | TIMEB←0 |
| J3 | (B1) |
| J4 | FK = 0 : (J5)<br>FK = 1 : (A6) |
| J5 | NK = 0 : (J3)<br>NK = 1 : (J6) |
| J6 | 1. NKB → TIMEB(1)<br>TIMEB is shifted to the left by on digit.<br>TMF←1<br>2. (J3) |

Fig.13-K

| Step | Instruction |
|---|---|
| K1 | INT←0 |
| K2 | (R8)←1 |
| K3 | 1. BSY←1<br>2. (L1) |
| K4 | 1. (R8)←0<br>2. (K3) |
| K5 | 1. END←1, CNT3←2<br>2. (K4) |

Fig.13-L

| Step | Instruction |
|---|---|
| L1 | DLYB = 0 : (L2)<br>DLYB = 1 : (L3) |
| L2 | TPF = 0 : (L4)<br>TPF = 0 : (L5) |
| L3 | 1. CK←1, BL←0, DP←4<br>2. (L6) |
| L4 | 1. CK←0, BL←0, DP←4<br>2. (L6) |
| L5 | 1. CK←0, BL←1, DP←11<br>2. (L6) |
| L6 | (B1) |
| L7 | INT = 0 : (L8)<br>INT = 1 : (L11) |
| L8 | END = 1 : (O1)<br>END = 0 : (L9) |
| L9 | DOOR = 1 : (L10)<br>DOOR = 0 : (L12) |
| L10 | SEC = 1 : (M1)<br>SEC = 0 : (L11) |
| L11 | FK = 1 : (A6)<br>FK = 0 : (L1) |
| L12 | DLYB = 1 : (L10)<br>DLYB = 0 : (E3) |

Fig.13-M

| Step | Instruction | Step | Instruction |
|---|---|---|---|
| M1 | SEC ← 0 | M16 | TMF = 0 : (K5)<br>TMF = 1 : (M17) |
| M2 | DLYB = 0 : (M3)<br>DLYB = 1 : (H7) | M17 | 1. TPF ← 0, TP ← 1<br>2. (M5) |
| M3 | TPS = 1 : (M4)<br>TPS = 0 : (M10) | M18 | 1. (R6) ← 1   3. NE ← 1<br>2. (R6) ← 0   4. (L11) |
| M4 | TIMEB − 1 → TIMEB | M19 | TEMPM → TEMPB |
| M5 | TIMEB = 0 : (K5)<br>TIMEB ≠ 0 : (M6) | M20 | 1. (R6) ← 1<br>2. (R6) ← 0 |
| M6 | TP = 0 : (L11)<br>TP = 1 : (M19) | M21 | TEMPB → (ACC)<br>TEMP → (OPR) |
| M7 | DELAY TIMEB → (ACC)<br>CLOCK → (OPR) | M22 | (ACC) ≧ (OPR) : M24<br>(ACC) < (OPR) : M23 |
| M8 | (ACC) = (OPR) : (M9)<br>(ACC) ≠ (OPR) : (L11) | M23 | 1. (R8) ← 1<br>2. (L11) |
| M9 | 1. END ← 1, CNT3 ← 1<br>2. (L11) | M24 | 1. (R8) ← 0<br>2. (L11) |
| M10 | NE = 0 : (M18)<br>NE = 1 : (M11) | | |
| M11 | TEMPM → TEMPB | | |
| M12 | 1. (R6) ← 1<br>2. (R6) ← 0 | | |
| M13 | TEMPB → (ACC)<br>TEMP → (OPR) | | |
| M14 | (ACC) ≧ (OPR) : (M15)<br>(ACC) < (OPR) : (L11) | | |
| M15 | TPS ← 1 | | |

Fig.13-N

| Step | Instruction |
|---|---|
| N1 | SB → CTLB<br>P (1,0~10) → P (2,0~10) |
| N2 | (B1) |
| N3 | TPF = 0 : (N4)<br>TPF = 1 : (N6) |
| N4 | 1. DELAY TIME → (ACC)<br>   TIME 1 (4,3) → (OPR)<br>2. (ACC) − (OPR) → (ACC) |
| N5 | 1. (ACC) → DELAY TIMEB<br>2. (K4) |
| N6 | TMF = 0 : (N7)<br>TMF = 1 : (N8) |
| N7 | 1. DELAY TIME → (ACC)<br>   10 minutes → (OPR)<br>2. (ACC) − (OPR) → (ACC)<br>3. (N5) |
| N8 | 1. TIME 1 → (ACC)<br>   10 minutes → (OPR)<br>2. (ACC) + (OPR) → AMEND |
| N9 | 1. DELAY TIME → (ACC)<br>   AMEND → (OPR)<br>2. (ACC) − (OPR) → (ACC)<br>3. (N5) |

Fig.13-O

| Step | Instruction |
|---|---|
| O1 | SEC = 0 : (O2)<br>SEC = 1 : (O3) |
| O2 | 1. (R10) ← 1<br>2. (L1) |
| O3 | SEC ← 0 |
| O4 | CNT3 − 1 → CNT3 |
| O5 | CNT3 = 0 : (O6)<br>CNT3 ≠ 0 : (L1) |
| O6 | (R10) ← 0 |
| O7 | END ← 0 |
| O8 | DLYB = 0 : (A2)<br>DLYB = 1 : (O9) |
| O9 | DLYB ← 0 |
| O10 | 1. P (2,0~10) → P (1,0~10)<br>2. (G3) |

ELECTRONICALLY CONTROLLED COOKING APPARATUS

This is a continuation of application Ser. No. 19,149, filed Mar. 9, 1979 now abandoned.

BACKGROUND OF THE INVENTION

In recent years, there has been realized a cooking apparatus which incorporates, as control means, a microprocessor comprising semiconductor large-scale integrated circuits, so that various cooking functions may be performed with simple circuit arrangements and simple operational procedures.

Such cooking functions typically includes a timer operation, a temperature operation, an output control operation, a delay time operation or combinations of such operations above-mentioned. Here, it is to be noted that the timer operation means that the cooking apparatus is operated for the desired period of time, the temperature operation means that the cooking apparatus is operated until food to be cooked is heated upto the desired temperature or that the cooking apparatus is operated for maintaining such desired temperature after such desired temperature has been reached, the output control operation means that the cooking apparatus is operated with the heating energy set to the desired value, and the display time operation means that, when the desired cooking completion time is being preset, the cooking apparatus is automatically started operating so that the cooking be finished at such desired completion time.

In controlling a combined operation of cooking functions above-mentioned, for example, when combining the timer operation with the delay time operation, the cooking apparatus can be set so as to start cooking at the time that the period of time preset for the timer operation is subtracted from the preset cooking completion time.

However, when intending to combine the temperature operation with the delay time operation, a period of time during which food to be cooked is heated to the preset temperature is not constant and varies with the contents of the food to be cooked. It is therefore not possible to calculate the period of time to be subtracted from the preset cooking completion time in order to find the cooking starting time. Such combination operation has therefore not been realized yet.

Furthermore, in such a cooking apparatus, there have been cases where the door of the cooking apparatus is opened during the supply of heating energy, for the purpose of making sure of the cooking condition, or accidentally. Therefore, there has advantageously been disposed a door open detection means for the safety purposes, whereby the operation of the cooking apparatus is stopped simultaneously with opening of the door. Thereafter, the door has been closed and a re-operation instruction has been give, so that heating energy has again been supplied.

However, such safety provision has produced an inconvenience in view of the automatic operation. Namely, in the case of the delay time operation, after various operational procesures have been applied to the cooking apparatus and before the cooking is not actually started, there have been cases where the door of the cooking apparatus is opened in order to make sure of how the food to be cooked is placed, or to apply additional treatments to the food to be cooked, or just accidentally. In such a case, according to the function of such safety provision the control of the cooking apparatus has not been reset to the normal status unless the re-operation instruction is given, even though the door has been closed. Thus, if application of such re-operation instruction has been failed, the cooking apparatus could not be started operating even though the predetermined time has come.

For the delay time operation, there have been cases where the operator is apart from the cooking apparatus before the cooking is actually started after various operational procedures have been applied to the cooking apparatus. In such a case, when the operator has forgotten the cooking start time and the cooking apparatus has therefore been started operating in the absence of the operator, not only necessary measures have not been taken, but also danger has been attended with if unexpected accidents such as burning of food to be cooked have taken place.

There have also been cases where, dependent on the kind of food to be cooked, it is desired to apply suitable treatments to the food to be cooked during the cooking, such as addition of seasonings. However, when the cooking has been started in the absence of the operator as above-mentioned or the operator, even though present near the cooking apparatus, has not become aware that the actual cooking start time had come and the cooking had been started, there has been a possibility of missing the opportunity for applying necessary treatment to the food during the cooking as above-mentioned. Particularly, when microwave energy is used as heating energy for the cooking, the cooking speed is very fast, so that it may well be that such opportunity for applying necessary treatment to the food during the cooking will easily be missed.

OBJECTS OF THE INVENTION

It is an object of the present invention to provide an electronically controlled cooking apparatus which may perform the combined functions of the temperature operation with the delay time operation.

It is another object of the present invention to provide an electronically controlled cooking apparatus in which, when the temperature operation is combined with the delay time operation, the temperature operation is regarded as a fixed period of time operation and the cooking is automatically started at the time which a fixed period of time for the temperature operation, for example the average period of time necessary for cooking food in the temperature operation mode with the present cooking apparatus, is subtracted from the preset cooking completion time, whereby the combined functions of the temperature operation and the delay time operation may be performed.

It is a further object of the present invention to provide an electronically controlled cooking apparatus in which, when the temperature operation and the timer operation are combined with the delay time operation, the temperature operation is regarded as a fixed period of time operation and the cooking is automatically started at the time which the fixed period of time for the temperature operation and the period of time necessary for the timer operation are subtracted from the preset cooking completion time, whereby the combined functions of the temperature operation, the timer operation and the delay time operation may be performed.

In the temperature operation to be combined with the delay time operation, it does not constitute any practical hindrance to regard said temperature operation as a fixed period of time operation, by setting such fixed period of time for the temperature operation to the average period of time necesary for the general temperature operation. Particularly, when microwave energy is used as heating energy for the cooking, the average period of time necessary for the general temperature operation is very short, for example maximum 10 minutes. Therefore, such hypothetical fixed period of time operation is practically convenient.

It is still another object of the present invention to provide an electronically controlled cooking apparatus which may perform the combined functions of the temperature operation and the delay time operation in a cooking apparatus such as an electronic oven, using microwave energy as heating energy.

It is still a further object of the present invention to provide an electronically controlled cooking apparatus in which, when an automatic starting operation such as the delay time operation is to be performed, a secure automatic start may be assured without exerting any influence upon the automatic starting operation control, even though the door of the cooking apparatus is opened before the actual cooking starting time has come.

In the case where the automatic starting operation is thus assured, when the door is opened and closed before the actual cooking starting time, it is expected to give a re-operation instruction, simultaneously with the time the door is opened and closed during the supply of the heating energy.

However, the control of the cooking apparatus should not be disturbed by such unnecessary instruction.

It is still a further object of the present invention to provide an electronically controlled cooking apparatus in which, when the automatic starting operation such as the delay time operation is performed, a re-operation instruction given prior to the actual cooking starting time is invalidated, thereby to prevent erroneous operations of the control means.

It is still a further object of the present invention to provide an electronically controlled cooking apparatus in which treatments necessary during the cooking may conveniently be applied to food to be cooked, without missing the appropriate opportunity for such treatments, in the automatic starting operation such as the delay time operation with a cooking apparatus such as a microwave oven using microwave energy as heating energy.

It is still a further object of the present invention to achieve the objects above-mentioned by using a microprocessor.

BRIEF DESCRIPTION OF THE DRAWINGS

The present invention will be further described by way of example, with reference to the accompanying drawings, in which:

FIG. 1 is a schematically perspective view of a microwave oven and a probe in accordance with the present invention;

FIG. 6, A and B show code conversions;

FIG. 11, A and B show the RAM areas of the microprocessor;

FIG. 12, A to O are flowcharts of programs contained in the microprocessor; and

FIG. 13, A to O are the contents of the programs to be executed.

DETAILED DESCRIPTION OF THE PREFERRED EMBODIMENT

Figure 2:
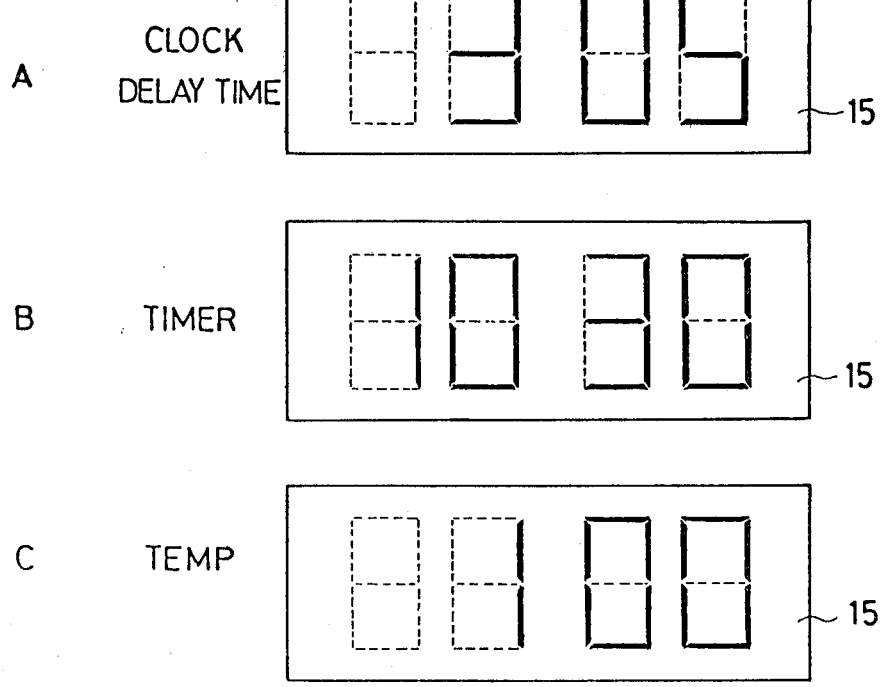
FIG. 2 shows the indicating forms of the indication portion of the microwave oven in FIG. 1.

The present invention will then be discussed in detail in its preferred embodiment. It is here to be noted that, although the present invention is applied to a microwave oven in the following embodiment, the present invention may also efficiently be applied to other electric cooking apparatus. It is further to be noted that, although the output control operation mentioned earlier is not included as cooking function in the cooking apparatus in the following embodiment of the present invention, the output control operation is known per se and it is easy to add such function to the following embodiment of the present invention.

FIG. 1 perspectively shows a microwave oven 10 in accordance with the present invention and a probe 11 to be used in the temperature operation in the microwave oven 10.

The microwave oven 10 is provided at the main body side thereof with a cooking chamber 12 and a control panel 13, and with a door 14 which is pivoted to the main body and adapted to close and open the opening of the cooking chamber 12. The control panel 13 is provided with an indication portion 15 for indicating information including time, and with an operation portion 16 for controlling the operation of the microwave oven 10, both to be discussed later.

The door 14 is provided at the internal side thereof with a door latch 17 and a door switch knob 18 which are projectingly disposed. When the door 14 is closed, the door latch 17 and the door switch knob 18 will enter the main body, thereby to turn an interlock switch and a door switch to ON, respectively.

The probe 11 is provided with a plug 20 and an insertion tip 19 in the needle shape. At the use of this probe 11, the insertion tip 19 will be inserted into food under cooking and the plug 20 will be inserted into a jack disposed at the inner wall of the cooking chamber 12. Incorporated in the insertion tip 19 of the probe 11 is a thermistor for detecting the temperature of the food under cooking, and this thermistor is connected to the plug 20 by a shield conductor 21.

FIG. 2, A to C show in detail the indicating forms of the indication portion 15. This indication portion 15 includes fluorescent numeral indication tubes which are known per se and capable of indicating a numeral for four figures and a colon.

FIG. 2, A shows the indicating form of the current time or the cooking completion time in the delay time operation mode, and in this example, indicates "3:05", including the colon centrally indicated.

FIG. 2, B shows the indicating form in the timer operation mode and, in this example, indicates 10 minutes 30 seconds with the colon never indicated.

FIG. 2, C shows the indicating form of the measured temperature of the food under cooking or the preset temperature in the temperature operation and, in this example, indicates 100° F. with the colon never indicated.

Figure 3:
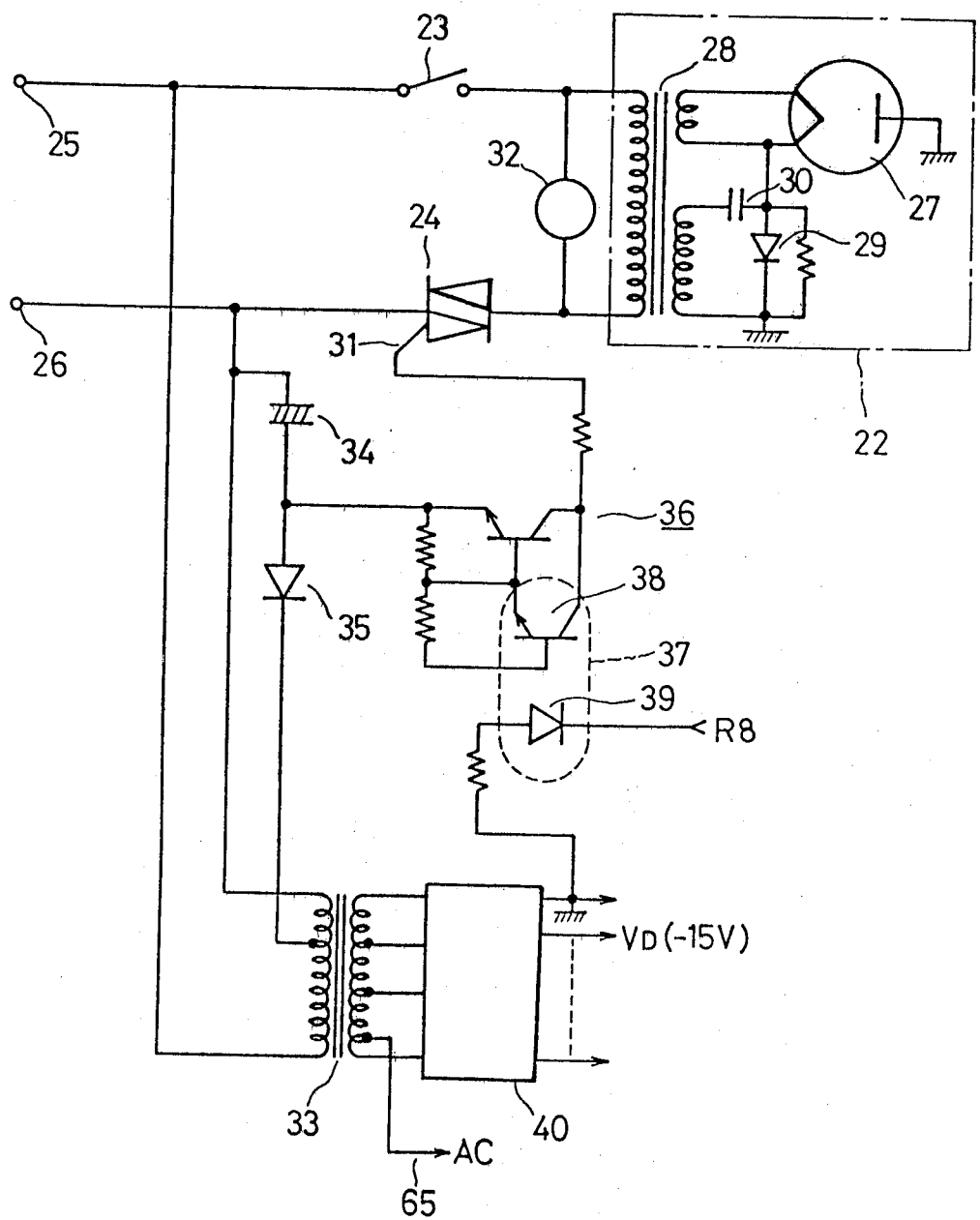
FIG. 3 shows in detail the operation portion of the present microwave oven.

FIG. 3 shows in detail the operation portion 16, which is provided with ten numeral keys from 0 to 9 and seven function keys of TIMER, CLOCK, CLEAR, DELAY START, START, TEMP and STOP. These keys may be made of usual contact-type push-button switches. The functions and operational procedures of such numeral keys and function keys will be discussed later.

Figure 4:
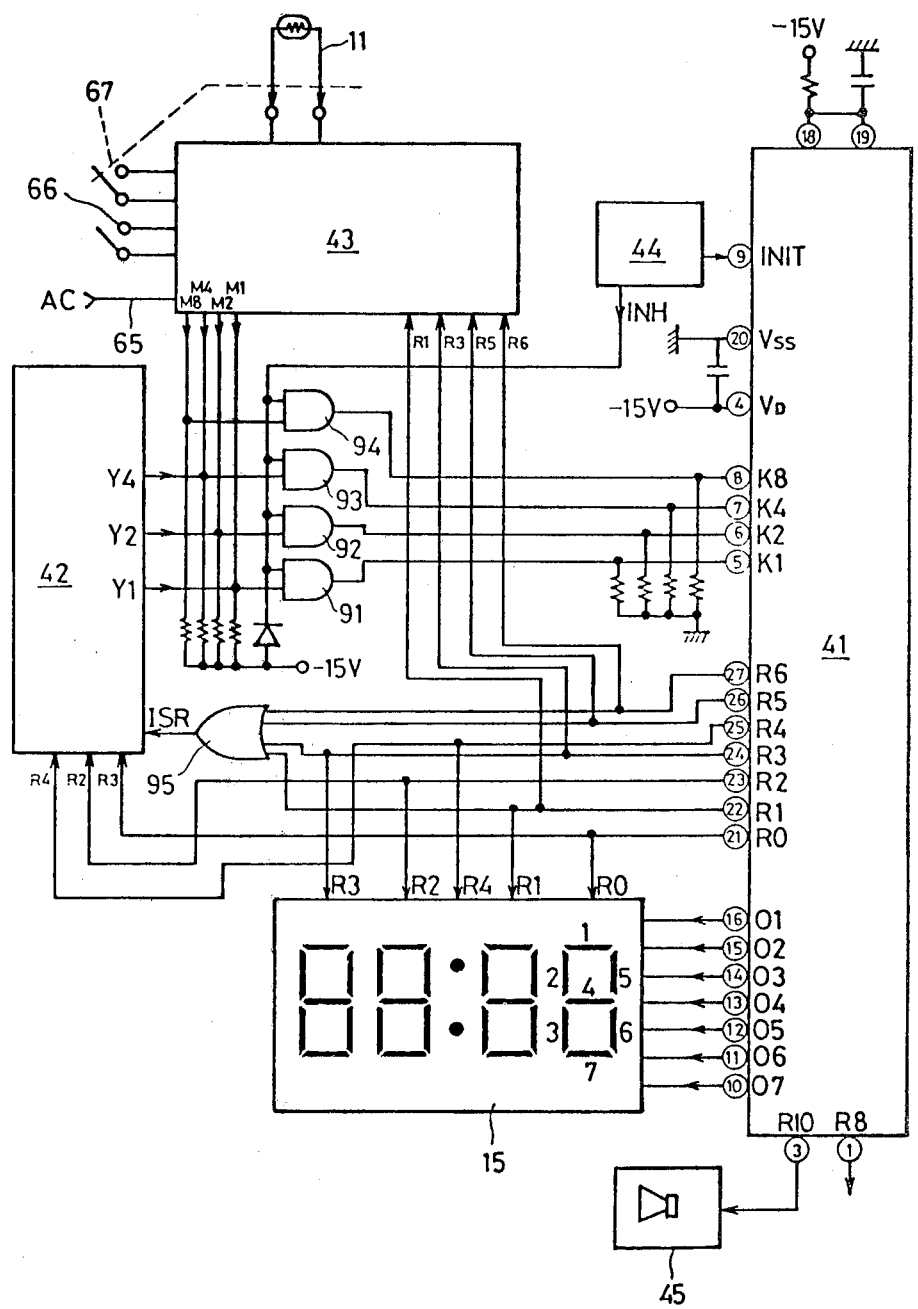
FIG. 4 A and B are electric circuit diagrams of the present microwave oven.

FIG. 4, A and B are electric circuit diagrams of the microwave oven 10. FIG. 4, A mainly shows the microwave generator and the power supply, and FIG. 4, B mainly shows the control for controlling the microwave generator above-mentioned.

In FIG. 4, A, the microwave generator 22 is connected to the terminals 25 and 26 of a 60 HZ commercial power supply through an interlock switch 23 and a bidirectional thyristor 24. The microwave generator 22 is arranged in a usual manner, including a magnetron 27, a high voltage transformer 28, a diode 29 and a capacitor 30. The interlock switch 23 is adapted to be turned ON by the door latch 17 discussed in connection with FIG. 1, and the bidirectional thyristor 24 is adapted to be turned ON when a gate signal is supplied to a gate 31.

Accordingly, when a gate signal is present in the gate 31 of the bidirectional thyristor 24 with the door 14 of the microwave oven 10 closed, the magnetron 27 generates microwaves and their energy is supplied to the cooking chamber 12 of the microwave oven 10.

A blower motor 32 is connected in parallel with the microwave generator 22 and during the oscillation of the magnetron 27, a fan to be driven by the blower motor 32 operates to cool the magnetron 27.

The power supply terminals 25 and 26 are connected to the other power transformer 33. An alternating current voltage dropped by the power transformer 33 is inverted to a direct current voltage by a rectifying and smoothing circuit comprising a capacitor 34 and a diode 35. Thus inverted direct current voltage is then applied to the gate 31 of the bidirectional thyristor 24 through a gate switch circuit 36. The gate switch circuit 36 includes a photo-transistor 38 in a photo-coupler 37, and a light-emitting diode 39 in the photo-coupler 37 emittes light upon the reception of the signal R8 from the control shown in FIG. 4, B. Gate signals are therefore supplied to the bidirectional thyristor 24 as far as the signal R8 is present.

In an direct current power supply circuit 40, alternating current voltages supplied from the power transformer 33 are inverted into various direct current voltages, which are then distributed to each portion of the circuit shown in FIG. 4, B.

In FIG. 4, B, the control is constituted by a microprocessor 41 comprising semi-conductor large-scale integrated circuits and in this embodiment the microprocessor TMS 1100 manufactured by Texas Instrument Co., Inc. in USA is used.

As shown, the microprocessor 41 has a number of input and output pins, which will be discussed in the following.

The No. 4 and No. 20 pins are power supply input terminals.

The No. 18 and No. 19 pins are terminals for a clock signal oscillator in the microprocessor 41. In this embodiment, the frequency to be oscillated from the oscillator above-mentioned is determined 350 KHZ by connecting such terminals to a resistor and a capacitor.

The No. 5 to No. 8 pins are data input terminals, into which data signals of K1, K2, K4 and K8 are supplied in a binary code from an operation input portion 42 and a measurement input portion 43.

The No. 10 to No. 16 pins are data output terminals, from which data signals of O7 to O1 in a binary code are given to the indication portion 15.

The No. 21 to No. 27 pins are control signal output terminals, from which control signals of R0 to R6 are supplied to the operation input portion 42, the measurement input portion 43 or the indication portion 15.

The No. 9 pin is an initial status setting signal input terminal, into which the initial status setting signal INIT is supplied from an initial status setting signal generating circuit 44.

The No. 1 pin is a heating instruction output terminal, from which the signal R8 mentioned earlier is supplied to the light-emitting diode 39 in the photo-coupler 37.

The No. 3 pin is a buzzer instruction output terminal, from which a buzzer signal R10 is supplied to a buzzer circuit 45.

Figure 5:
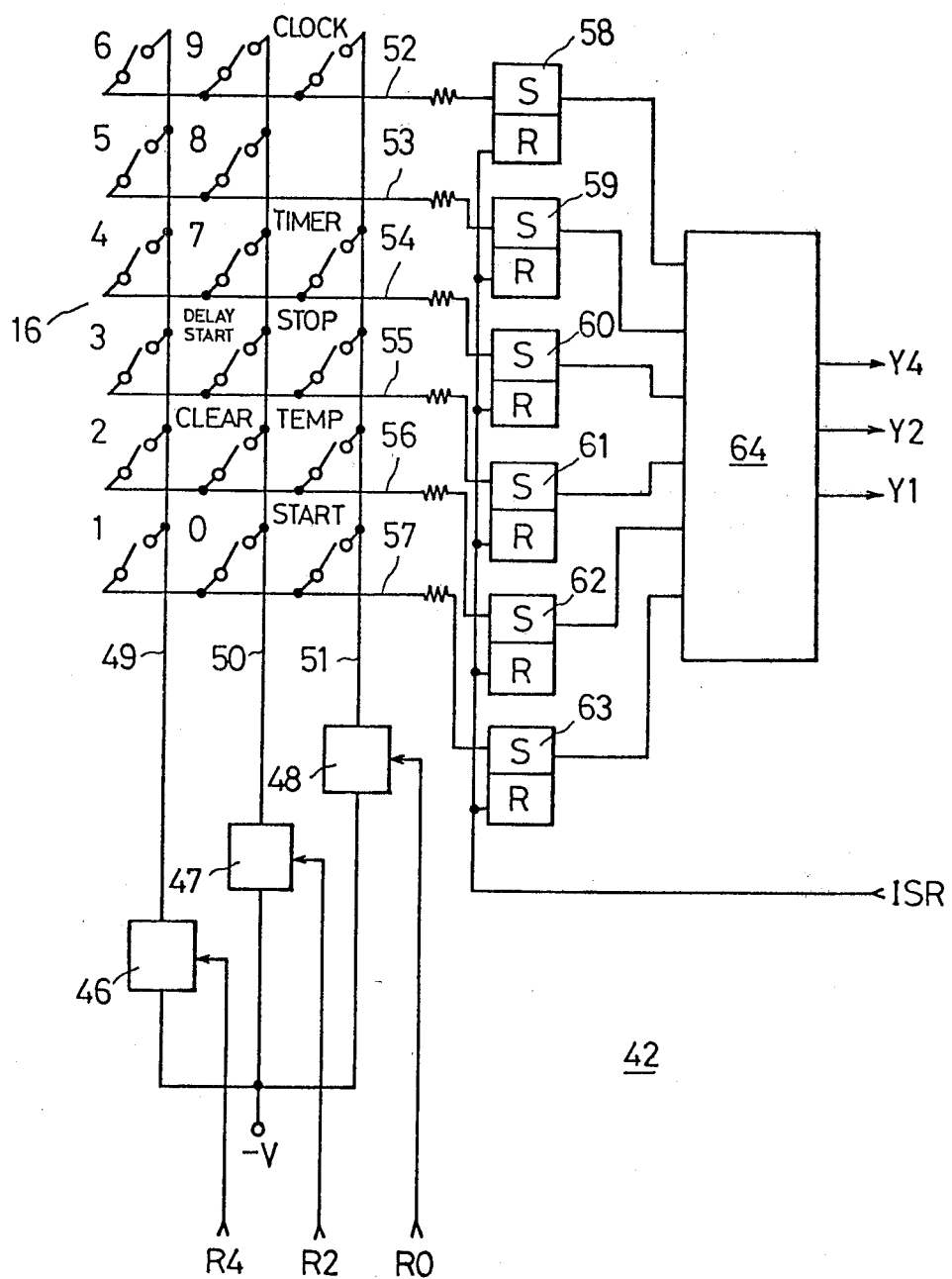
FIG. 5 is a detailed electric circuit diagram of the operational input portion in the electric circuit diagrams in FIG. 4.

As shown in detail in FIG. 5, the operation input portion 42 includes switches corresponding to the keys of the operation portion 16 shown in FIG. 3.

When a control signal of R4, R2 or R0 is supplied from the microprocessor 41, the corresponding transistor switch 46, 47 or 48 becomes conductive and control signal is supplied to a first ranged line 49, a second ranged line 50 or a third ranged line 51 of each of the switches of the operation portion 16.

A first line 52 to a sixth line 57 of the switches at the operation portion 16 are connected to set input lines of a first flip-flop 58 to a sixth flip-flop 63 through resistors. Supposing now that, for example, the control signal R4 is being supplied, when any one of the switches disposed at the first range is turned ON, a flip-flop corresponding to the switch is set. Each of set outputs from the first flip-flop 58 to the sixth flip-flop 63 is supplied to an encoder 64, from which key signals of Y1, Y2 or Y4 converted into a 3-bit code are given out. The first flip-flop 58 to the sixth flip-flop 63 are to be reset by a reset signal ISR. Accordingly, when a key belonging to the range corresponding to the generated control signal R4, R2 or R0 is operated after all flip-flops 58 to 63 have been reset by the reset signal ISR, the coded key signal of Y1, Y2 or Y4 corresponding to this key is given out. Such relationship between the keys and the corresponding coded key signals is shown in FIG. 6, A. Such key signals are processed in a BCD code in the microprocessor 41, and their relationship is shown in FIG. 6, B.

Figure 7:
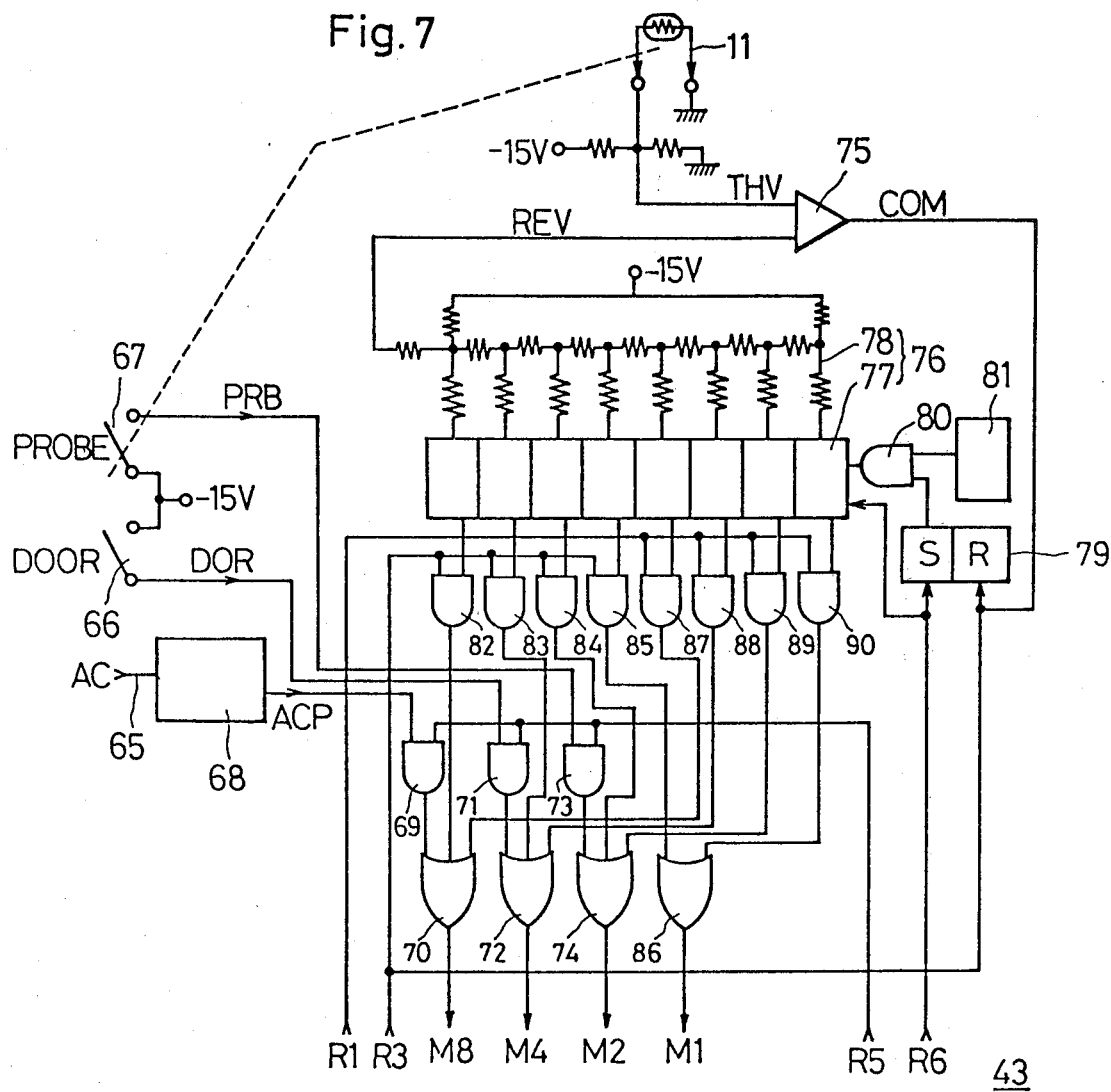
FIG. 7 is a detailed electric circuit diagram of the measurement input portion in the electric circuit diagrams in FIG. 4.

As shown in detail in FIG. 7, an AC signal line 65, a door switch 66, a probe sensor switch 67 and the probe 11 are connected to the measurement input lines of the measurement input portion 43.

The AC signal line 65 is connected to the power transformer 33 shown in FIG. 4, A and is to transfer a 60 Hz signal AC. Such signal AC supplied to the measurement input portion 43 is converted into a 60 Hz pulse signal ACP which can be generated only at the 90° phase of the 60 Hz signal AC, by a peak detector 68 well known per se, and thus converted signal ACP is then given out as signal M8 through an AND gate 69 and an OR gate 70.

The door switch 66 is to be turned ON by the door knob 18 discussed in connection with FIG. 1. When this door switch 66 is turned ON or the door is closed, a signal DOR is generated. This signal DOR is then given out as a signal M4 through an AND gate 71 and an OR gate 72.

The probe sensor switch 67 is to be turned ON when the plug 20 of the probe 11 discussed in connection with FIG. 1 is connected to the jack disposed in the microwave oven 10. When this probe sensor switch 67 is turned ON, a signal PRB is generated. This signal PRB is then given out as a signal M2 through an AND gate 73 and an OR gate 74.

When the plug 20 of the probe 11 is connected to the jack in the microwave oven 10, the probe 11 generates a voltage THV corresponding to the temperature which is detected by the probe insertion tip 19. This voltage THV is then supplied to a comparator 75. A step voltage REV from a step voltage generating circuit 76 well known per se is being supplied to the other input terminal of the comparator 75, and when both input voltage are coincided with each other, the comparator 75 generates a signal COM.

Figure 8:
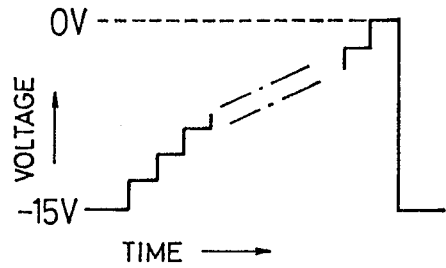
FIG. 8 shows a wave form of a step wave voltage signal.

The step voltage generating circuit 76 comprises a 8-bit binary counter 77 and a resistance ladder circuit 78 to be connected to each of the bit output terminals of the binary counter 77, and generates a step voltage REV having 256 steps according to the number of counts counted by the counter 77, as shown in FIG. 8. The first step of the step voltage REV corresponds to 1° F., and thereafter each step corresponds to 1° F. Therefore, the final step corresponds to 255° F.

When the control signal R6 is supplied from the microprocessor 41, the contents in the counter 77 are cleared and a flip-flop 79 is set. By its set output, an AND gate 80 is opened and a count pulse is supplied to the counter from an oscillator 81 for oscillating pulses of 10 KHZ oscillation frequency. Thereafter, when the signal COM is generated from the comparator 75, the flip-flop 79 is reset and the AND gate 80 is closed.

Outputs of the most significant 4 bits from the counter 77 are given out as signals of M8, M4, M2 and M1 through corresponding AND gates 82 to 85 and OR gates 70, 72, 74 and 86. Outputs of the least significant 4 bits from the counter 77 are given out as signals of M8, M4, M2 and M1 through corresponding AND gates 87 to 90 and OR gates 70, 72, 74 and 86.

The microprocessor 41 generates control signals R6, R5, R3 and R1 in succession. In the measurement input portion 43, the counter 77 is operated by the control signal R6 and leaves the count contents corresponding to the temperature detected by the probe 11. By the control signal R5, the AND gates 69, 71 and 73 are then opened, and the 60 Hz pulse signal ACP, the door signal DOR and the probe sensor signal PRB are subsequently given out as the signals of M8, M4 and M2, respectively. Then, by the control signal R3 the AND gates 82 to 85 are opened and the contents of the most significant 4 bits from the counter 77 are then given out as the signals M8, M4, M2 and M1. Thereafter, by the control signal R1 the AND gates 87 to 90 are opened, and the contents of the least significant 4 bits from the counter 77 are then given out as the signals of M8, M4, M2 and M1.

Referring again to FIG. 4, B, the output signals Y1, Y2 and Y4 from the operation input portion 42 and the output signals M1, M2 and M4 from the measurement input portion 43 are commonly supplied to the microprocessor 41 as data signals of K1, K2 and K4 through the AND gates 91 to 93. The output signal M8 from the measurement input portion 43 is supplied to the microprocessor 41 as a data signal K8 through the AND gate 94. As discussed above, the output signals Y1, Y2 and Y4 and the output signals M1, M2 and M4 are associated with each other. Therefore, in order to prevent such association from being confused, the control signals R1, R3, R5 and R6 from the microprocessor 41 are supplied to the operation input portion 42 as the reset signal ISR mentioned earlier, through the OR gate 95.

Figure 9:
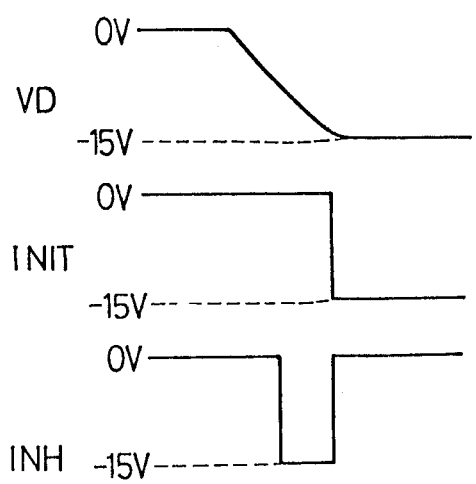
FIG. 9 shows wave forms for illustrating initial status setting signals.

The initial status setting signal generating circuit 44 is a circuit well known per se. The moment the microwave oven 10 is energized, as shown in FIG. 9 this initial status setting signal generating circuit 44 detects the rising-up of an output voltage $V_D$ from the direct current power supply circuit 40 shown in FIG. 4.A and generates the initial status setting signal INIT and an inhibit signal INH. By the inhibit signal INH the AND gates 91 to 94 are closed so that the data signals are not supplied to the microprocessor 41 from the operation input portion 42 or the measurement input portion 43. Meanwhile, the microprocessor 41 is set to the initial status by using the initial status setting signal INIT.

As mentioned earlier, the indication portion 15 comprises the fluorescent numeral indication tubes well known per se and their drive circuits. The control signal R0 from the microprocessor 41 serves as a first digit selection signal, the control signal R1 as a second digit selection signal, the control signal R2 as a third digit selection signal and the control signal R3 as a fourth digit selection signal.

The data signals O1 to O7 from the microprocessor 41 serve as segment selection signals of the digits. For example, when the data signals O1, O3, O4, O5 and O7 are present in the presence of the control signal R1, the numeral "2" is indicated on the indication second digit. In the indication portion 15, the control signal R4 serves as a colon digit selection signal and the data signal O4 serves as a colon selection signal. By both signals of R4 and O4, the colon is lighted on.

The buzzer circuit 45 above-mentioned is a circuit well known per se and includes a sound producing circuit containing a speaker, which produces a sound as far as the control signal R10 from the microprocessor 41 is present.

Figure 10:
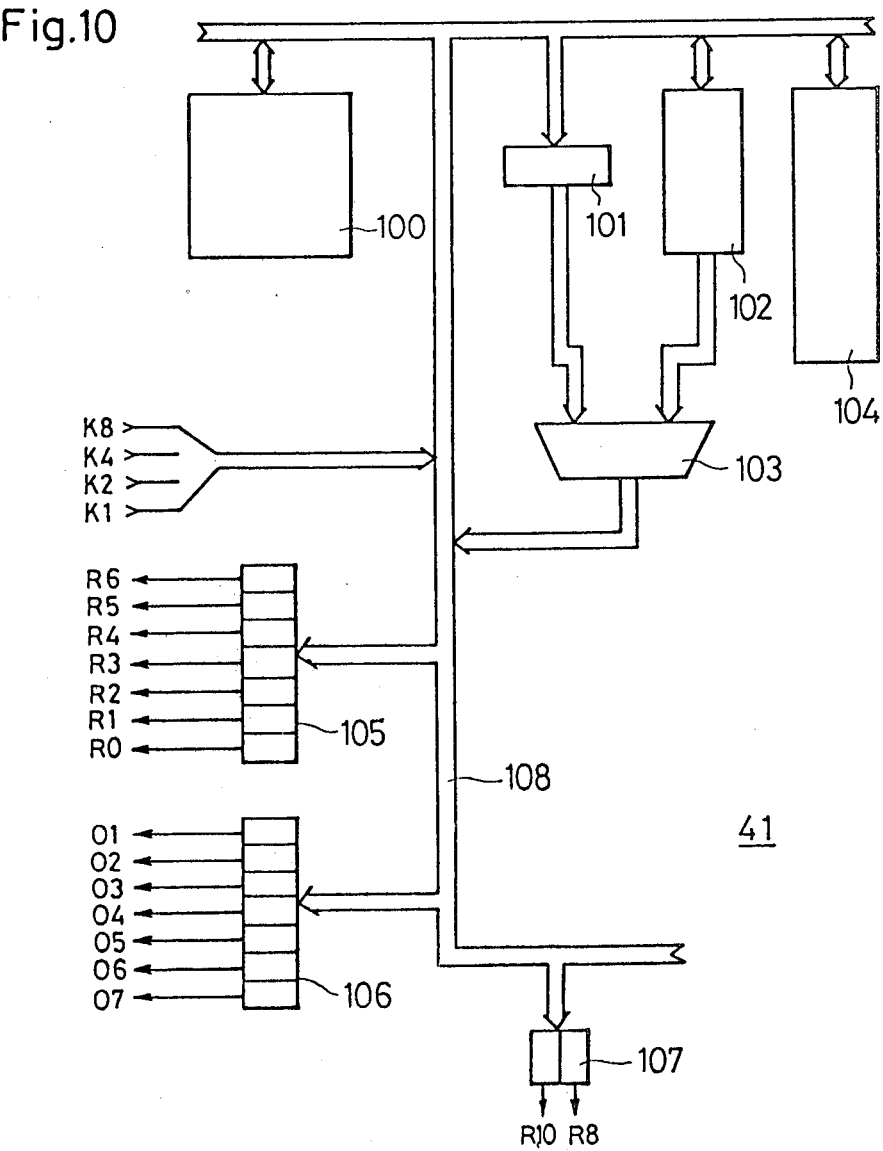
FIG. 10 is a detailed block diagram of the microprocessor in the electric circuits in FIG. 4.

FIG. 10 shows the inside of the microprocessor 41 which incorporates a control unit 100, an operating register 101, a register group 102 including accumulators, an arithmetic logic unit 103, a random access memory 104 (hereinafter referred to as RAM), a control output register 105, a data output register 106 and an instruction output register 107. Transfer of information between the elements above-mentioned is made through a data bus 108 and is controlled by the control unit 100.

The signals K1, K2, K4 and K8 supplied from the outside are supplied to the data bus 108. The control signals R0 to R6 to be supplied to the outside are given out from the control output register 105. The data signals O1 to O7 are given out from the data output register 106. The heating instruction signal R8 and the buzzer instruction signal R10 are given out from the instruction output register 107. During the time the binary code "1" is written into the specified bits of the output registers above-mentioned, these output registers give out the corresponding signals.

The control unit 100 includes a read-only-memory (hereinafter referred to as ROM) for storing control programs and constants, a program counter for advancing the steps of the control programs above-mentioned and a instruction decoder for decoding various kinds of instructions read out from the control program steps, thereby to execute the programs.

The RAM 104 stores various kinds of data, and its memory areas are shown in FIG. 11, A. In the memory areas of the RAM 104, pages from 0 to 4 and digit addresses from 0 to 15 in each page are provided. A particular memory area may therefore be specified by designating the page and the digit address. For this purpose, the RAM 104 includes also an address register. Each of the digits from 0 to 15 in the RAM 104 is of a 4-bit length. Some of the digit contents shown in FIG. 11, A are further illustrated in detail in FIG. 11, B.

The control unit 100 performs the control operations by using mainly such RAM 104. FIG. 12 show the flowchart of the programs which are stored in the ROM mentioned earlier for this purpose. FIG. 13 show the contents of operations to be executed at each of steps of the programs.

The description will then be made of how to read FIG. 13, by way of example.

P[1-4, 0-15] (Example: A2 step) means the contents of the 0 to 15 digit addresses in each of the pages from 1 to 4 in the RAM 104.

CK→1 (Example: A3 step) means that the constant "1" is written into the CK area in the RAM 104.

(B1) (Example: A4 step) means that the program is proceeded to the B1 step.

FK=0: (A4) (Example: A5 step) means that the program is proceeded to the A4 step if the contents of the FK area in the RAM 104 are "0".

[R5]→1 (Example: B1 step) means that "1" is written into the bit (hereinafter referred to as R5 bit) corresponding to the signal R5 of the control output register 105.

(K1 to K8)→SB (Example: B1 step) means that the data signals of K1 to K8 are transferred to the SB area in the RAM 104.

[O4]→1 (Example: B4 step) means that "1" is written into the bit (hereinafter referred to as O4 bit) corresponding to the signal O4 from the data output register 106.

CLOCK-TIMEB (Example: B4 step) means that the contents of the CLOCK area in the RAM 104 are transferred to the TIMEB area.

[ACC] (Example: B5 step) means the accumulator in the register group 102.

P[1, (DP-1)] (Example: B10 step) means the contents of the digit address corresponding to the contents which "1" is subtracted from the contents of the DP area in the RAM 104, in the page 1 of the RAM 104.

[O] (Example: B11 step) means all bits of the data output register 106.

TEMPM (2) (Example: B13 step) means the second digit of the TEMPM area in the RAM 104 (namely, the 9th digit address of the page 3).

CNT1-1→[ACC] (Example: C1 step) means that the contents which "1" is subtracted from the CNT1 area in the RAM 104, are supplied to the accumulator.

[OPR] (Example: M8 step) means the operating register 101.

Although not shown in FIG. 13, at the actual control operation the constant is written into a particular area in the RAM 104 in such a way that the constant is read out from the ROM in the control unit 100 and then written directly into the area in the RAM 104. The addition and subtraction between the contents of two particular areas in the RAM 104 are made in such a way that an operated numeral is taken out to the accumulator and an operating numeral is taken out to the operating register 101 and these numerals are passed through the arithmetic logic unit 103.

The addition and subtraction between the constant and the contents of a particular area in the RAM 104 is made in such a way that the contents of the RAM 104 are taken out to the accumulator and the constant is taken out to the operating register 101 and such constant and contents are passed through the arithmetic logic unit 103.

Comparison between the contents of two particular areas in the RAM 104, or comparison between the constant and the contents of a particular area in the RAM 104 is made in the arithmetic logic unit 103 in a similar way as the addition and subtraction above-mentioned. The data code conversion is also made by passing through the arithmetic logic unit 103. When data are transferred from a transfer origin to a transfer destination, the contents of the transfer origin are still stored after the transfer thereof.

The functions of the microwave oven in accordance with the present invention will be described by referring to FIGS. 12 and 13.

[Start of Energizing]

At the beginning when the microwave oven is energized, the initial status setting signal INIT discussed in connection with FIG. 4, B is supplied to the microprocessor 41 from the initial status setting circuit 44. The microprocessor 41 therefore sets the control program automatically to the A1 step of the initial routine (FIG. 12, A).

At the A1 step, 0 is written into the 0 to 9 digit addresses of the 0 page in the RAM 104 and these areas are therefore cleared. At the A2 step, the remaining areas are cleared in a similar way. At the A3 step, in order to designate the indication of the current time, 1, 0 and 1 are written into the areas of CK, BL and CD in the RAM 104, respectively. The BCD code corresponding to the numeral 4 is written into the DP area. At the A4 step, the program is proceeded to the B1 step of the sub-routine (FIG. 12, B) of [Indication, Key Sense, CLOCK].

At the B1 step, 1 is firstly written into the R5 bit of the control output register 105, and subsequently the 60 Hz pulse signal ACP, the door signal DOR and the probe sensor signal PRB are supplied as input data signals of K8, K4 and K2, respectively. Then, such signals are stored in the CLK, DOOR and SNSR of the SB area in the RAM 104, together with K1 (0 in this example). Reading-in of the signals of ACP, DOOR and PRB above-mentioned is then finished after 0 has been written into the R5 bit above-mentioned.

At the B2 step, the contents of the CLK area in the RAM 104 are checked, and if the 60 HZ pulse signal above-mentioned has come at the B1 step, the program is proceeded to the B36 step and if such pulse signal has not come, the program is proceeded to the B3 step.

At the B36 step, the program is proceeded to the C1 step of the [CLOCK Count] routine (FIG. 12, C). In the

[CLOCK Count] routine, the 60 HZ pulse signal is counted to form a second signal and a minute signal, and the current time is renewed by using such minute signal.

At the C1 step, 1 is subtracted from the contents of the CNT1 area in the RAM 104 and the subtracted result is supplied to the accumulator. At the C2 step, when the contents of the accumulator above-mentioned are 0, the program is proceeded to the C3 step, and when the contents of the accumulator are not 0, such contents are transferred to the CNT1 area and thereafter the program is returned to the B3 step of The [Indication, Key Sense, CLOCK] routine. At the C3 step, 59 is written into the CNT1 area in the RAM 104. At the C4 step, 1 is written into the SEC area in the RAM 104. At the C5 step, 1 is subtracted from the contents of the CNT2 area in the RAM 104 and the subtracted result is then supplied into the accumulator. At the C6 step, when the contents of the accumulator above-mentioned are 0, the program is proceeded to the C7 step, and when the contents of the accumulator are not 0, such contents are transferred to the CNT2 area and thereafter the program is returned to the B3 step of the [Indication, Key Sense, CLOCK] routine.

At the C7 step, 59 is written into the CNT2 area in the RAM 104, and at the C8 step, first of all, 1 is added to the CLOCK area in the RAM 104. Namely, the CLOCK area is of a 4-digit length, and the least significant digit corresponds to the minute unit, the second digit to the 10-minute unit, the third digit to the 1-hour unit and the most significant digit to the 10-hour unit. At the C7 step, the time of the CLOCK area is advanced in a minute unit. At the C7 step, the program is then returned to the B3 step of the [Indication, Key Sense, CLOCK] routine.

Accordingly, a second count is counted by passing through the [CLOCK Count] routine 60 times, and a minute count is counted by passing through the [CLOCK Count] routine 3600 times. On the other hand, each of the digits of the CLOCK area is carried by a sexagenary system, and subsequently the current time is renewed in the CLOCK area by the minute counts above-mentioned.

The program is again returned to the B3 step of the [Indication, Key Sense, CLOCK] routine. At this B3 step, by referring to the CK area in the RAM 104, it is checked whether or not the contents to be indicated at the indication portion 15 are time indications. Namely, when the CK area is 1, it means the time is to be indicated and the program is then proceeded to the B4 step. When the CK area is not 1, the program is proceeded to the B5 step.

At the B4 step, colon lighting preparations are made, and it is checked whether or not the current time is to be indicated at the indication portion 15, and in the affirmative, the preparation for indicating the current time is made. Namely, as the colon lighting preparation, 1 is written into the O4 bit of the data output register 106. When the DLYB area in the RAM 104 is 1 or the CD area is 1, it means that the current time is to be indicated, and the current time present in the CLOCK area is subsequently transferred to TIMEB.

At the B5 step, 1 is written into the R4 bit of the control output register 105. If the colon lighting preparation has already been made, the colon is then lighted on at the indication portion 15, and if the numeral keys of 1 to 6 have been operated at the operation portion 16 by the occurrence of the control signal R4, the key signals Y1, Y2 and Y4 are supplied as the input data signals of K1, K2 and K4 to the accumulator, together with the other data signal K8 (0 in this example).

At the B6 step, it is judged whether or not the contents of this accumulator are 0. When the contents are 0, it is judged that no key operations have been performed, and the program is then proceeded to the B7 step. When the contents are not 0, it is judged that key operations have been performed, and the program is then proceeded to the B37 step.

Supposing now that no key operations have been made, the program is proceeded to the B7 step. At the B7 step, 1 is written into the NOP area in the RAM 104, and it is stored that no key operations have been made. At the B8 step, after the counter has counted for a predetermined period of time, 0 is written into the R4 bit of the control output register 105 and 0 is also written into all bits of the data output register 106. Reading-in of the key signals of the numerals of 1 to 6 and the colon lighting is then completed. Also, 0 is written into the ZS area in the RAM 104.

At the B9 steps, the FL area in the RAM 104 is checked. However, because the contents of this area are initially reset, the program is proceeded to the B10 step.

At the B10 step, it is checked whether or not the forth digit of the contents to be indicated at the indication portion 15 is to be indicated. For this purpose, checking is firstly made of the BL area in the RAM 104. Because the contents of this area have already been set to 0 at the A3 step, it is judged whether or not the contents of the forth digit of the TIMEB area in the RAM 104 are 0. When such contents are 0, the program is proceeded to the B12 step, and when not 0, the program is proceeded to the B11 step. When the contents of the BL area is 1, the program is immediately proceeded to the B12 step.

At the B12 step, for inhibiting the indication of the forth digit, 0 is written into the data output register 106 and 1 is written into the ZS area in the RAM 104. The program is then proceeded to the B13 step. At the B11 step, the contents of the forth digit of the TIMEB area in the RAM 104 are converted from the BCD code into the 7 segment code of the indication portion 15, and transferred to the data output register 106. The program is then proceeded to the B13 step.

At the B13 step, 1 is firstly written into the R3 bit of the control output register 106. Namely, by the control signal R3, the forth digit is lighted on at the indication portion 15, and the most significant 4 bits of the counter 77 in the measurement input portion 43 are read in and then set into the second digit of the TEMPM area in the RAM 104.

At the B14 step, after the counter has counted for a predetermined period of time, 0 is written into the R3 bit of the control output register 105 and 0 is all written into the data output register 106, thus completing the lighting indication of the forth digit.

At the B15 step, it is checked whether or not the third digit of the contents to be indicated at the indication portion 15 is to be indicated. Namely, the ZS area in the RAM 104 is firstly checked. When the contents of the ZS area are 0, the program is proceeded to the B16 step, and when not 0, the contents of the third digit of the TIMEB area in the RAM 104 are checked. When such contents are 0, the program is proceeded to the B17 step and when not 0, the program is proceeded to the B16 step.

At the B17 step, in order to prevent the indication of the third digit, 0 is all written into the data output register 106 and 0 is also written into the ZS area in the RAM 104. The program is proceeded to the B18 step.

At the B16 step, the contents of the third digit of the TIMEB area in the RAM 104 is converted from the BCD code into the 7 segment code of the indication portion 15 and then transferred into the data output register 106, and 1 is written into the ZS area in the RAM 104. The program is then proceeded to the B18 step.

At the B18 step, 1 is written into the R2 bit of the control output register 105, so that the third digit is indicated at the indication portion 15. If the numeral keys of 0, 7, 8 and 9 and the CLEAR and DELAY keys at the operation portion 16 have been operated, the key signals of Y1, Y2 and Y4 are supplied as input data signals of K1, K2 and K4 to the accumulator, together with the other data signal K8 (0 in this example).

At the B19 step, it is judged whether or not the contents of this accumulator are 0. When the contents are 0, it is judged that no key operation has been made, and the program is then proceeded to the B20 step. When not 0, it is judged that key operation has been made, the program is then proceeded to the B43 step through the B52 step. At the B52 step, 0 is written into the NOP area in the RAM 104.

Supposing now that no key operation has been made at all, the program is proceeded to the B20 step. At this B20 step, after the counter has counted for a predetermined period of time, 0 is written into the R2 bit of the control output register 105 and 0 is all written into the data output register 106, thus completing the lighting indication of the third digit.

At the B21 step, it is checked whether or not the second ddigit of the contents to be indicated at the indication portion 15 is to be indicated. Namely, the ZS area in the RAM 104 is firstly checked. When the contents of this area are 1, the program is proceeded to the B22 step, and when the contents of this area are 0, the contents of the second digit of the TIMEB area in the RAM 104 are checked. When such contents are 0, the program is proceeded to the B23 step, and when not 0, the program is proceeded to the B22 step. At the B22 step, the contents of the second digit of the TIMEB are converted from the BCD code into the 7 segment code of the indication portion 15 and then transferred to the data output register 106. The program is then transferred to the B24 step.

At the B24 step, 1 is written into the R1 bit of the control output register 105, so that the second digit is lighted on at the indication portion 15. The least significant 4 bits of the counter 77 in the measurement input portion 43 are read in and then set to the first digit of the TEMPM area in the RAM 104.

At the B25 step, after the counter has counted for a predetermined period of time, 0 is written into the R1 bit of the control output register 105 and also 0 is written into the data output register 106, so that the lighting indication of the second digit is completed.

At the B26 step, the contents of the least significant digit of the TIMEB area in the RAM 104 are converted from the BCD code into the 7 segment code of the indication portion 15 and then transferred to the data output register 106.

At the B27 step, 1 is written into the R0 bit of the control output register 105, so that the first digit is indicated at the indication portion 15. If the keys of CLOCK, TIMER, STOP, TEMP and START have been operated, the key signals of Y1, Y2 and Y4 are supplied as the input data signals of K1, K2 and K4 to the accumulator, together with the other data signal K8 (0 in this example).

At the B28 step, it is judged whether or not the contents of this accumulator are 0. When such contents are 0, it is judged that no key operation has been made, and the program is then proceeded to the B29 step, and when not 0, it is judged that key operation has been made, and the program is then proceeded to the B31 step.

Supposing now that no key operation has been made at all, the program is proceeded to the B29 step. At this B29 step, by referring to the contents of the NOP area in the RAM 104, it is checked whether or not the key operation has been made.

In this example, the contents of the NOP area are 1 and it is subsequently judged that no key operation has been made. The program is therefore proceeded to the B53 step. At this B53 step, 0 is written into the NOP area in the RAM 104. The program is then proceeded to the B35 step.

At the B35 step, after the counter has counted for a predetermined period of time, 0 is written into the R0 bit of the control output register 105 and also 0 is all written into the data output register 106, thus completing the lighting indication of the first digit and the detection of key signals of CLOCK, TIMER, STOP, TEMP and START keys.

The program is returned from [Indication, Key Sense, CLOCK] routine to the A5 step of the [Initial] routine, in this example.

At the A5 step, it is checked whether or not the key operation just prior to this step has been made for the function keys. Namely, the FK area in the RAM 104 is checked. In this example, however, because the FK area is initially cleared, it is judged that no key operation has been made for the function keys, and the program is returned to the A4 step. Thereafter, as far as the function keys are not operated, the program is circulated within the A4 and A5 steps. Here, it is to be noted that the program is proceeded to each step in a very fast speed, for example 20 micro seconds.

In summary, when the microwave oven is energized, all areas in the RAM 104 are firstly cleared. Thereafter, the time counting operation is performed in the CLOCK area in the RAM 104 and the contents of the CLOCK area are indicated on the indication portion 15. In this example, no time setting has been made to the contents of the CLOCK area, and the indication portion 15 therefore indicates the time counted from the 0:00 state after the microwave oven has been energized.

[Time Setting]

For setting the time to be indicated on the indication portion 15, the CLOCK key at the operation portion 16 is used. For example, when intending to set the indication time to 2:00, the keys of CLOCK, 2, 0, 0 and CLOCK are operated in this order.

According to the key operation above-mentioned, proceeding of the program will then be discussed in the following.

As mentioned earlier, the program is circulated within the A4 and A5 steps of the [Initial] routine. Accordingly, when the CLOCK key is operated, this key operation is detected at the B27 step of the [Indication, Key Sense, CLOCK] routine. The key input signal 0110 of the CLOCK key is then supplied to the accumulator and the program is proceeded to the B31 step from the B28 step.

At the B31 step, by referring to the fact that the KE area in the RAM 104 is 0, it is judged that the first key operation has been made, and the program is then proceeded to the B32 step.

At the B32 step, the contents of the accumulator above-mentioned, i.e., the CLOCK key input signal, are transferred to the FKB area in the RAM 104.

At the B33 step, 1 is written into the FK and KE areas in the RAM 104, thereby to store that the function key operation has been made and the first key operation has been made. Thereafter, the program is proceeded to the A5 step of the [Initial] routine through the B53 and B35 steps.

At the A5 step, it is judged that the function key operation has been made, and the program is therefore proceeded to the A6 step.

At the A6 step, the contents of the FKB area in the RAM 104 are checked according to the code table shown in FIG. 6, B. When such contents are corresponding to the STOP key, the program is proceeded to the A13 step, and when such contents are not corresponding to the STOP key, the program is proceeded to the A7 step. Thereafter, in a similar way as above-mentioned, checkings are made of whether or not the contents are corresponding to the TEMP key, at the A7 step; whether or not corresponding to the START key, at the A8 step; whether or not corresponding to the DELAY key, at the A9 step; whether or not corresponding to the CLEAR key, at the A10 step; and whether or not corresponding to the CLOCK key, at the A11 step. The program is then proceeded to the A17 step.

At the A17 step, the program is proceeded to the I1 step of the [CLOCK KEY] routine (FIG. 12, I).

At this I1 step, by referring to the NE area in the RAM 104, it is judged whether or not numeral setting has been made. In this example, because the NE area is initially cleared, the program is proceeded to the I2 step. At the I2 step, 1, 1 and 0 are written into the CK, CD and BL area in the RAM 104, respectively, and the BCD code corresponding to the numeral 4 is written into the DP area. After the TIMEB area has been cleared, at the I3 step the program is proceeded to the B1 step of the [Indication, Key Sense CLOCK] routine.

Accordingly, while passing through the [Indication, Key Sense, CLOCK] routine, the colon and the digits of the TIMEB area in the RAM 104 are indicated in succession from the most significant digit on the indication portion 15. In this example, however, all digits of the TIMEB area are 0 and only the first digit is therefore indicated. In the course of passing through this routine, the program is proceeded to the B31 step through the B28 step. However, because the contents of the KE area in the RAM 104 are 1 at this time, the program is proceeded to the B34 step. At this B34 step, 0 is written into the FK area in the RAM 104, and the program is then proceeded to the B35 step through the B52 step, and then to the I4 step of the [CLOCK KEY] routine.

At the I4 step, the FK area in the RAM 104 is checked. In this example, the FK area is 0 and the program is therefore proceeded to the I5 step. At this I5 step, it is checked whether or not the numeral keys have been operated. In this example, the NK area in the RAM 104 is 0 and the program is therefore returned to the I3 step. Accordingly, as far as the CLOCK key operation is continued, the program is circulated within the I3, I4 and I5 steps. When the clock key operation abovementioned is absent during such circulation, 0 is written into the KE area in the RAM 104 at the B30 step of the [Indication, Key Sense, CLOCK] routine, so that the memory of the first key operation is released. Thereafter, as far as no key operation is performed, the program is circulated within the I3, I4 and I5 steps of the [CLOCK KEY] routine in the similar way.

When the numeral key of 2 is operated, the program is proceeded to the B37 step from the B6 step of the [Indication, Key Sense, CLOCK] routine in the course of the circulation abovementioned. At this B37 step, by referring to the fact that the KE area in the RAM 104 is 0, it is judged that the first key operation has been made, and the program is then proceeded to the B38 step. At the B38 step, the contents of the accumulator, i.e. the BCD code corresponding to the numeral 2, are transferred to the NKB area in the RAM 104.

At the B39 step and B40 step, 1 is written into the NK and KE areas in the RAM 104, thereby to store that the numeral key operation has been made and the first key operation has been made, and the program is then proceeded to the B8 step.

Thereafer, the program is proceeded to the I4 and I5 steps after passing through the [Indication, Key Sense, CLOCK] routine. At the I5 step, by referring to the NK area in the RAM 104, it is judged that the numeral key operation has been made, and the program is then proceeded to the I6 step.

At this I6 step, 1 is firstly written into the NE area in the RAM 104, thereby to store that the numeral setting has been made. The digit contents of the TIMEB area are carried by one digit, and the contents of the NKB area are transferred to the first digit of the TIMEB area. Accordingly, the code corresponding to the numeral 2 is being stored in the first digit of the TIMEB area. The program is then returned to the I3 step.

When the program is entered into the [Indication, Key Sense, CLOCK] routine at the I3 step, it is judged at its B37 step that it is not the first key operation. The program is then proceeded to the B41 step.

At the B41 step, 0 is written into the NK area in the RAM 104, thereby to cancel the memory of the numeral key operation, and the program is then returned to the B8 step. Accordingly, the program is returned to the I3 step through the I4 and I5 steps after passing through the [Indication, Key Sense, CLOCK] routine. Thereafter, the program is circulated within the I3, I4 and I5 steps. In the course of this circulation, the numeral 2 is indicated on the first digit at the indication portion 15, together with the colon.

When 0 and 0 are thereafter supplied to the operation portion 16 in the same way, the code corresponding to the numeral "200" is stored in the TIMEB area in the RAM 104, so that "2:00" is indicated on the indication portion 15.

The program is still circulated within the I3, I4 and I5 steps of the [CLOCK KEY] routine. When the CLOCK key operation is again made at this time, the program is proceeded to the I4 step of the [CLOCK KEY] routine through the B28, B31, B33, B53 and B35 of the [Indication, Key Sense, CLOCK] routine, and then proceeded to the A6 step of the [Initial] routine.

The program is then returned to the [CLOCK KEY] routine through the A6, A7, A8, A9, A10, A11 and A17 steps. At its I1 step, the program is proceeded to the I7 step.

By referring to the fact that the FL area in the RAM 104 is 0, it is then informed that it is not in the course of the alarm mode, and the program is then proceeded to the I8 step.

At the I8 step, it is checked whether or not the set numeral is correct, namely whether or not the numeral is set between 12:59 and 1:00. More particularly, either when the forth and third digits of the TIMEB area in the RAM 104 are both 0, or when the forth digit is larger than 1, or when the forth digit is 1 and the third digit is larger than 2, or when the second digit is larger than 5, it is regarded that the setting error has been made, and 1 is written into the MIS area in the RAM 104.

At the I9 step, the MIS area above-mentioned is checked. When the MIS area is 0, it is judged that the numeral setting is correct and the program is proceeded to the I10 step.

At the I10 step, the contents of the TIMEB area in the RAM 104 are transferrred to the CLOCK area and 0 is written into the NE area.

At the I11 step, the code corresponding to 59 is written into the CNT1 and CNT2 areas in the RAM 104, and thereafter the program is proceeded to the A3 step of the [INITIAL] routine.

Thus, when the second CLOCK key operation above-mentioned is made at the moment the time is just 2:00, the CLOCK area in the RAM 104 is renewed with the lapse of time from 2:00 and the current time is indicated on the indication portion 15. The program is then circulated with the A4 and A5 steps of the [Initial] routine.

On the other hand, supposing now that the numeral setting is not correct at the I9 step above-mentioned, 1 is written into the FL area in the RAM 104 at the I12 step and the program is then proceeded to the I3 step.

At this I3 step, when the program is entered into the [Indication, Key Sense, CLOCK] routine, at its B9 step the program is proceeded to the B42 step. At the B42 step, the program is proceeded to the D1 step of the [Indication Flash] routine (FIG. 12, D).

The [Indication Flash] routine is for flashing the information indicated on the indication portion 15, thereby to inform that the set numeral is not correct.

At the D1 step, the FL1 area in the RAM 104 is checked. In this example, the contents of this area are left as initially cleared, and the program is therefore proceeded to the D2 step.

At the D2 step, the SEC area in the RAM 104 which is a second signal, is checked. When the SEC area is 0, the program is returned, and when the SEC area is 1, the program is returned after 1 has been written into the FLI and SEC areas at the D3 and D4 steps, respectively. Because such return is made within the [Indication, Key Sense, CLOCK] routine, the program is proceeded to the A5 step of the [Initial] routine, in this example. Accordingly, no indication is made on the indication portion 15 at this time.

The program is then returned to the A4 step and entered into the [Indication, Key Sense CLOCK] routine. At its B9 step, the program is entered again into the [Indication Flash] routine. At this time, the program is proceeded to the D5 step from the D1 step. When the second signal is not present, the program is returned to the B10 step, and when the second signal is present, 0 is written into the FLI and SEC areas in the RAM 104 at the D6 and D7 steps, respectively, and the program is then returned to the B10 step. Accordingly, the indication is made on the indication portion 15 at this time.

Thereafter, the program is circulated within the A5 and A4 steps and flash indications are therefore made per second. This state may be cancelled by newly performing the CLEAR key operation. The CLEAR key will be discussed later. [Delay Time Operation Combined with Timer Operation and Temperature Operation].

For the delay time operation where the cooking is to be completed at the time later than the current time, for example at 6:00, and the cooking is to be made in such a way that food is heated to a predetermined temperature, for example 100° F., and such predetermined temperature is maintained for a predetermined period of time, for example 10 minutes, the keys of |DELAY START|, |6||0||0| |TIMER|, |1||0||0||0|, |TEMP|, |1||0||0| and |START| are operated in this order.

According to the key operations above-mentioned, the program proceeding will then be described in the following.

As already mentioned, the program is being circulated within the A4 and A5 steps of the [Initial] routine. Acordingly, when the DELAY START key is operated, this key operation is detected at the B19 step of the [Indication, Key Sense, CLOCK] routine. On the other hand, the DELAY START key input signal 0011 is being supplied to the accumulator at the B18 step, and the program is proceeded to the B43 step through the B52 step.

At the B43 step, by referring to the fact that the KE area in the RAM 104 is 0, it is judged that the first key operation is made, and the program is then proceeded to the B44 step.

At the B44 step, it is judged that the contents of the accumulator above-mentioned are the function key signals, and the program is the proceded to the B45 step.

At the B45 step, the contents of the accumulator abovementioned are converted in code according to the code table shown in FIG. 6, B, and thus converted codes are stored in the FKB area in the RAM 104.

At the B46 step, 1 is written into the FK area in the RAM 104, and the program is then proceeded to the B51 step.

At the B51 step, 1 is written into the KE area in the RAM 104 and the program is then proceeded to the B20 step.

Thereafter, the program is passed through the [Indication, Key Sense, CLOCK] routine and then proceeded to the A6, A7, A8 and A9 steps from the A5 step. At the A9 step, it is judged that the contents of the function key are the DELAY START key, and thereafter the program is proceeded to the A16 step. At the A16 step, the program is proceeded to the H1 step of the [DELAY KEY] routine (FIG. 12, H).

At the H1 step, 1, 1 and 0 are written to the CK, DLY and CD areas in the RAM 104, respectively, as DELAY preparations, and the BCD code corresponding to the numeral 4 is written into the DP area. Also, the TIMEB area is cleared.

At the H2 step, the program is entered into the [Indication, Key Sense, CLOCK] routine. From the B19 step of this routine, the program is then proceeded to the B43 step. Because the KE area in the RAM 104 is 1 at this time, the program is proceeded to the B49 step. At the B49 step and B50 step, 0 is written into the FK and NK areas in the RAM 104, respectively, and thereafter the program is proceeded to the B20 step.

Thereafter, the program is passed through the [Indication, Key Sense, CLOCK] routine and again entered into the H2 step through the H3 and H4 steps. Thus, the program is circulated in such a loop. In the course of this circulation, the contents of the TIMEB area in the RAM 104 are indicated. In this example, however, 0 is indicated only on the first digit of the indication portion 15, because such contents are all 0.

When the numeral 6 key is then operated, the key input signal corresponding to the numeral 6 is supplied to the NKB area in the RAM 104 in the [Indication, Key Sense, CLOCK] routine in the course of the circulation above-mentioned, in the similar way as the case of the time setting mentioned earlier. Thereafter, at the H4 step, the program is proceeded to the H5 step.

At the H5 step, the contents of the TIMEB area in the RAM 104 are carried one digit and the contents of the NKB area are transferred to the least significant digit of the TIMEB area. Accordingly, the numeral 6 is being set to the TIMEB area at this time. Such numeral setting is then stored, by writing 1 into the NE area in the RAM 104. Thereafter, the program is proceeded to the H2 step and the circulated within the H3, H4, and H2 steps. Then, 6 is indicated on the least significant digit of the indication portion 15, together with the colon.

Thereafter, the numeral 0 key is operated twice, and the program is then similarly circulated within the H3, H4 and H2 steps. In the course of this circulation, "6:00" is indicated on the indication portion 15.

When the TIMER kew is then operated, the TIMER key is similarly detected in the [Indication, Key Sense, CLOCK] routine in the course of the circulation above-mentioned. The code corresponding to the FKB area in the RAM 104 is then set and the program is proceeded to the H6 step from the H3 step. At the H6 and H7 steps, the contents of the FKB area i.e., the contents of the function key are checked, and at the H7 step, the program is proceeded to the H9 step.

At the H9 step, the NE area in the RAM 104 is checked and it is judged that the numeral setting has been made. Then, the program is proceeded to the H10 step. At this H10 step, O is written into the NE area and the program is then proceeded to the H11 and H12 steps.

At the H11 and H12 steps, the processings completely same as at the I8 and I9 steps in the [CLOCK KEY] routine mentioned earlier are performed. When the numeral setting is correct, the program is proceeded to the H14 step. When not correct, the program is proceeded to the H13 step.

At the H13 step, 1 is written into the FL area in RAM 104 and the program is proceeded to the H2 step. Similarly as the case of the time setting operation mentioned earlier, the program is proceeded from the H2 step to the [Indication, Key Sense, CLOCK] routine. While the program is thereafter circulated within the A4 step and A5 step, flash indications are made at the indication portion 15, so that error in the setting time is informed.

When the set numeral has been correct and the program is then proceeded to the H14 step, the contents of the TIMEB area in the RAM 104 are transferred to the DELAY TIME area and the contents of the DLY area are transferred to the least significant bit of the DLYB area. That is, the contents of the DLYB area become 1. The program is then proceeded to the A6 step.

From this A6 step, the program is proceeded to the A12 step through the A7, A8, A9, A10 and A11 steps. At the A12 step, the program is proceeded to the J1 step in the [TIMER KEY] routine (FIG. 12, J).

At the J1 step, as preparatory procedures for TIMER, O is written into the CK and BL areas in the RAM 104 and the BCD code corresponding to the numeral 4 is written into the DP area.

At the J2 step, the TIMEB area in the RAM 104 is cleared. As already apparent, the program is thereafter circulated within the J3, J4 and J5 steps.

When the numeral key "1" is operated, the key input signal corresponding to 1 is supplied to the NKB area in the RAM 104 in the [Indication, Key Sense, CLOCK] routine in the course of the circulation above-mentioned. Thereafter, at the J5 step, the program is proceeded to the J6 step. At the J6 step, the contents of the TIMEB area in the RAM 104 are carried by one digit and the contents of the NKB area are transferred to the least significant digit of the TIMEB area. Now, 1 is thus being set to the TIMEB area. By writing 1 into the TMF area in the RAM 104, it is stored that such numeral setting has been made. Thereafter, the program is proceeded to the J3 step and circulated within the J3, J4 and J5 steps.

1 is then indicated on the least significant digit of the indication portion 15.

Then, the numeral key of "0" is operated three times and the program is similarly circulated within the J3, J4 and J5 steps. At the indication portion 15, 1000 is indicated.

The TEMP key is then operated, the TEMP key is detected in the [Indication, Key Sense, CLOCK] routine in the course of the circulation above-mentioned, and the corresponding code is set into the FKB area in the RAM 104. The program is then proceeded from the J4 step to the A6 step in the [Initial] routine.

Thereafter, the program is proceeded from the A6 step to the A7 step. At the A7 step, it is detected that the TEMP key operation has been made. The program is then proceeded to the A14 step. From this A14 step, the program is then proceeded to the F1 step in the [TEMPKEY] routine (FIG. 12, F).

At the F1 step, as preparatory procedures for TEMP, 0 and 1 are written into the CK and BL areas in the RAM 104, respectively, and the binary code corresponding to 11 is written into the DP area.

At the F2 step, the TIMEB area in the RAM 104 is cleared. As already apparent, the program is thereafter circulated within the F3, F4 and F5 steps.

When the numeral key of 1 is operated, the key input signal corresponding to 1 is supplied into the NKB area in the RAM 104. At the F5 step, the program is then proceeded to the F6 step. At the F6 step, the contents of the TEMPB area in the RAM 104 are carried by one digit, and the contents of the NKB area are transferred to the least significant digit of the TEMPB area. Now, 1 is thus being set to the TEMPB area. By writing 1 into the TPF area in the RAM 104, it is stored that such numeral setting has been made. Thereafter, the program is proceeded to the F3 step and again circulated within the F3, F4 and F5 steps. Because the numeral of 11 is present in the DP area in the RAM 104, the contents of the TEMPB area are indicated on the indication portion 15, whereby the numeral of 1 is indicated on the least significant digit of the indication portion 15.

Then, the numeral key of 0 is operated twice, the program is similarly circulated within the F3, F4 and F5 steps and 100 is indicated on the indication portion 15.

When the START key is then operated, the START key is detected in the [Indication, Key Sense, CLOCK] routine in the course of the circulation above-mentioned and the corresponding code is set into the FKB area in the RAM 104. The program is then proceeded to the A6 step of the [Initial] routine from the F4 step.

The program is then proceeded from the A6 step to the A8 step through the A7 step. At this A8 step, it is detected that the START key operation has been made. The program is then proceeded to the A15 step and from this A15 step, proceeded to the G1 step of the [START KEY] routine (FIG. 12, G).

At the G1 step, 0 is written into the SEC area in the RAM 104. At the G2 step, by referring to the DOOR area in the RAM 104, it is checked whether or not the door 14 of the microwave oven is closed. When this DOOR area is 0, it means that the door 14 is opened, and the program is then proceeded to the [STOP KEY] routine. When the DOOR area is 1, it means that the door 14 is closed, and the program is then proceeded to the G3 step.

Supposing now that the door 14 is closed, the program is proceeded to the G3 step. At this G3 step, by referring to the TMF area in the RAM 104, it is informed that the timer period of time (10 minutes) has already been set, and the program is then proceeded to the G5 step. At this G5 step, by referring to the TPF area in the RAM 104, it is informed that the temperature (100° F.) has already been set, and the program is then proceeded to the G8 step.

At this G8 step, by referring to the SNSR area in the RAM 104, it is checked whether or not the probe 11 has been connected. When this SNSR area is 1, it means that the probe 11 has been connected, and the program is then proceeded to the G9 step. When the SNSR area is 0, it means that the probe 11 has not been connected, and the program is then proceeded to the [STOP KEY] routine.

Supposing now that the probe 11 has been connected, the program is proceeded to the G9 step. At this G9 step, by referring to the DLYB area in the RAM 104, it is checked whether or not the delay time operation is being conducted. When such operation is being conducted, the program is proceeded to the G10 step. When not being conducted, the program is proceeded to the [START] routine.

Because the delay time operation is now being conducted, the program is proceeded to the G10 step. At this G10 step, the contents of the TEMPB area in the RAM 104, that is, the preset temperature, are transferred to the TEMP area, and the program is then proceeded to the N1 step of the [DELAY START] routine (FIG. 12, N).

At the N1 step, the contents of the 0 to 10 digit addresses of the 1st page in the RAM 104 are transferred to the 0 to 10 digit addresses of the 2nd page. At the N2 step, the program is then proceeded to the B1 step in the [Indication, Key Sense, CLOCK] routine.

Thereafter, the program is proceeded to the N3 step. At this N3 step, by referring to the TPF area in the RAM 104, it is judged that the temperature setting has been made, and the program is then proceeded to the N6 step. At the N6 step, by referring to the TMF area in the RAM 104, it is judged that the timer period of time has been set, and the program is then proceeded to the N8 step. At the N8 step, the contents of the forth and third digits of the TIME1 area in the RAM 104 (Namely, the 10-second digit and 1-second digit are omitted) and the BCD code corresponding to 10 minutes, are read out on the accumulator and the operating register 101, respectively. The former and the latter are then added to each other, and thus added result is then transferred to the AMEND area in the RAM 104.

At the N9 step, the contents of DELAY TIME area and the AMEND area above-mentioned are read out on the accumulator and the operating register 101, respectively. The latter is subtracted from the former, and thus subtracted result is supplied to the accumulator. The program is then proceeded to the N5 step.

At the N5 step, the contents of the accumulator above-mentioned are transferred to the DELAY TIMEB area in the RAM 104. Stored then in the DELAY TIMEB area in the RAM 104 is, in this example, the cooking starting time of 5:40 which the predetermined timer period of time (10 minutes) and the fixed period of time (10 minutes), for example the average period of time required for the temperature operation of food to be cooked with the present cooking apparatus, are subtracted from the cooking completion time of 6:00. Here, it is to be noted that the fixed period of time (10 minutes) above-mentioned is determined by regarding the temperature operation as the 10-minute fixed period of time operation. The program is then proceeded to the K4 step in the [START] routine (FIG. 12, K).

At the K4 step, 0 is written into the R8 bit of the instruction output register 107, and the program is then proceeded to the K3 step.

At this K3 step, by writing 1 into the BSY area in the RAM 104, it is stored that the microwave oven is under operation. Thereafter the program is proceeded to the L1 step of the [RUN] routine (FIG. 12, L).

At the L1 step, by referring to the DLYB area in the RAM 104, it is informed that the delay time operation is being conducted, and the program is then proceeded to the L3 step. At the L3 step, preparatory operations for indicating the current time are made. 1 and 0 are written into the CK and BL areas in the RAM 104, respectively, and the BCD code corresponding to 4 is written into the DP area. The program is then proceeded to the L6 step. From this L6 step, the program is then proceeded to the [Indication, Key Sense, CLOCK] routine. As already apparent, the current time is indicated at the indication portion 15 during the time the program passes through this routine. After passing through this routine, the program is proceeded to the L7 step. At the L7 step, by referring to the INT area in the RAM 104, it is informed that no part-way stop has been required, and the program is then proceeded to the L8 step. At this L8 step, by referring to the END area in the RAM 104, it is informed that completion is not required, and the program is then proceeded to the L9 step.

At this L9 step, by referring to the DOOR area in the RAM 104, it is informed that the door is closed, and the program is proceeded to the L10 step.

At the L10 step, when no second signal is present in the SEC area in the RAM 104, the program is proceeded to the L11 step, and when a second signal is present, the program is proceeded to the [RUN2] routine.

At the L11 step, it is checked whether or not the function keys have been operated at the L6 step above-mentioned. However, supposing now that the START key is still continuously operated, 0 is written into the FKB area in the RAM 104 at the B34 step, in the [Indication, Key Sense, CLOCK] routine at the L6 step above-mentioned. Accordingly, the program is returned from the L11 step to the L1 step, and thereafter circulated within the L1, L3, L6 and L12 steps. When the second signal is generated in the course of this circulation, at the L10 step the program is proceeded to the M1 step of the [RUN2] routine (FIG. 12, M).

At the M1 step, 0 is written into the SEC area in the RAM 104. At the M2 step, by referring to the DLYB area in the RAM 104, it is informed that the delay time operation is being conducted, and the program is then proceeded to the M7 step. At the M7 step, the contents of the DELAY TIMEB area and the CLOCK area in the RAM 104 are transferred to the accumulator and the operating register 101, respectively, and at the M8 step, these contents are compared with each other. Namely, the cooking starting time is compared with the current time. Supposing now that the current time is before the cooking starting time, the program is returned to the L11 step of the [RUN] routine. Accordingly, while the [RUN] routine is repeatedly executed, the current time is indicated. Meanwhile, the program is entered into the [RUN2] routine every second for checking whether or not the cooking starting time has come.

When the door 14 of the microwave oven is opened during this time, this door opening is checked at the L9 step, and the program is then proceeded to the L12 step.

At the L12 step, by referring to the DLYB area in the RAM 104, it is judged that the delay time operation is being conducted, and the program is proceeded to the L10 step.

When the current time reaches the cooking starting time (5:40), it is detected at the M8 step of the [RUN2] routine, and the program is then proceeded to the M9 step. At this M9 step, 1 is written into the END and CNT3 areas in the RAM 104. Writing 1 into the END area is for storing the completion, and writing 1 into the CNT3 area is for determining the period of time during which a buzzer sound is produced for informing the cooking start. The program is then proceeded to the L11 step.

The program is again proceeded to the L8 step through the L1, L3, L6 and L7 steps. At this L8 step, the completion signal is detected and the program is then proceeded to the 01 step of the [Buzzer] routine (FIG. 12, O).

At the 01 step, the SEC area in the RAM 104 is checked. When the SEC area is 0, the program is proceeded to the 02 step. At this 02 step, 1 is written into the R10 bit of the instruction output register 107. The signal R10 is therefore given out and the buzzer circuit 45 produces a buzzer sound. Thereafter, the program is entered into the [RUN] routine and therefore circulated within the L1, L3, L6, L7, L8, 01 and 02 steps. As far as this circulation is continued, the buzzer sound is continuously produced.

When the second signal is produced thereafter, the program is proceeded to the 01 step to the 03 step. At the 03 step, 0 is written into the SEC area in the RAM 104. At the 04 step, 1 is subtracted from the contents of the CNT3 area in the RAM 104. At the 05 step, the CNT3 area above-mentioned is checked for detecting that the buzzer sounding period of time has passed. Because the contents of this area are now 0, the program is proceeded to the 06 step.

At this 06 step, 0 is written into the R10 bit of the instruction output register 107. As the result, the buzzer circuit produces the buzzer sound for about 1 second.

At the 07 step, 0 is written into the END area in the RAM 104. At the 08 step, by referring to the DLYB area in the RAM 104, it is judged that the delay time operation is being conducted, and the program is then proceeded to the 09 step. At this 09 step, 0 is written into the DLYB area. At the 010 step, the contents of the 0 to 10 digit addresses of the 2nd page in the RAM 104 are returned back to the 0 to 10 digit addresses of the 1st page. The program is then proceeded to the G3 step of the [START KEY] routine.

The program is then proceeded to the G9 step through the G3, G5 and G8 steps. At the G9 step, by referring to the fact that the DLYB area in the RAM 104 is 0, it is informed that the delay time operation is not being conducted, and the program is then proceeded to the K1 step of the [START] routine (FIG. 12, K).

At the K1 step, 0 is written into the INT area in the RAM 104. At the K2 step, 1 is written into the R8 bit of the instruction output register 107. Namely, the microwave is started being supplied at this time. It is to be noted that a number of steps of the program have been executed from the time when the cooking starting time has come, to the time when the microwave is started being supplied, but such execution speed is very fast, so that the microwave is started being supplied substantially from the cooking starting time above-mentioned. The program is then entered into the [RUN] routine through the K3 step.

At the L1 step of the [RUN] routine, it is checked that the delay time operation is not being conducted, and the program is transferred to the L2 step. At this L2 step, by referring to the TPF area in the RAM 104, it is informed that the temperature setting has been made, and the program is then proceeded to the L5 step.

At the L5 step, 0 and 1 are written into the CK and BL domains in the RAM 104, respectively, as preparatory procedures for indicating the measured temperature. The binary code corresponding to 11 is written into the DP area. Thereafter, the program is circulated within the L6, L7, L8, L9, L10, L11, L12, L1, L2 and L5 steps. In the course of this circulation, the preset temperature (100° F.) is indicated at the indication portion 15.

When the second signal is then generated, at the L10 step the program is proceeded to the [RUN2] routine. Through the M1 and M2 steps of this routine, the program is proceeded to the M3 step. At this M3 step, the TPS area in the RAM 104 is checked. Because the contents of this TPS area are now 0, the program is proceeded to the M10 step. At this M10 step, it is checked whether or not the first temperature measurement is made. Namely, the NE area in the RAM 104 is checked. Because the contents of this NE area are now 0, it is judged that the first temperature measurement is made, and the program is then proceeded to the M18 step. At the M18 step, the R6 bit of the control output register 105 is set to 1 for a short period of time. As the result, the temperature measurement is started at the measurement input portion 43, and the measured temperature information is stored into the counter 77, correspondingly to the temperature measured by the probe 11. 1 is written into the NE area in the RAM 104, so that it is stored that the first temperature measurement has been made. The program is then proceeded to the L11 step.

Thereafter, the program is circulated within the L1, L2 and L5 to L11 steps. In the course of this circulation, the 8-bit measured temperature information is stored into the TEMPE area in the RAM 104 at the B13 and B24 steps of the [Indication, Key Sense, CLOCK] routine.

When the second signal is then produced, at the L10 step the program is proceeded to the [RUN2] routine. Through the M1, M2, M3 and M10 steps of this [RUN2] routine, the program is proceeded to the M11 step. At the M11 step, the 8-bit measured temperature in the binary number which is present in the TEMPM area in the RAM 104, is binary-to-decimal converted, thereby to be indicated in a three-digit BCD code, which is then transferred to the TEMPB area in the RAM 104. At the M12 step, for the next temperature measurement, the R6 bit of the control output register 105 is set to 1 for a short period of time. Similarly, a new 8-bit measured temperature in the binary number is stored into the counter 77 of the measurement input portion 45. At the M13 step, the contents of the TEMPB area and the TEMP area in the RAM 104 are read out on the accumulator and the operating register 101, respectively. When the contents of the TEMPB area are smaller than those of the TEMP area at the M14 step, the program is proceeded to the L11 step, and when the former is larger than the latter, program is proceeded to the M15 step. Namely, the measured temperature is compared with the preset temperature. Supposing now that the measured temperature does not reach yet the preset temperature, the program is entered into the L11 step.

The program is therefore circulated within the L1, L2, L5, L6 to L11 steps. In the course of this circulation, the contents of the TEMPB area in the RAM 104, namely, the measured temperature, are indicated at the indication portion 15, in the [Indication, Key Sense, CLOCK] routine. When the second signal is again generated, the program is entered into the [RUN2] routine at the L10 step. As the result, every second the temperature is measured and comparison between the measured temperature and the preset temperature is made.

When the measured temperature reaches the preset temperature, it is detected at the M14 step of the [RUN2] routine, and the program is then proceeded to the M15 step. At this M15 step, 1 is written into the TPS area in the RAM 104. At the M16 step, the TMF area in the RAM 104 is checked. Because the timer period of time is now being preset, the program is proceeded to the M17 step. At the M17 step, 0 and 1 are written into the TPF and TP areas in the RAM 104, respectively, and the program is proceeded to the M5 step.

At the M5 step, by referring to the TIMEB area in the RAM 104, it is checked whether or not the period of time preset to the timer has passed. Because the timer preset period of time has not passed yet in this example, the program is proceeded to the M6 step.

At the M6 step, by referring to the contents of the TP area in the RAM 104, the program is proceeded to the M19 step.

At the M19 step to M22 step, the jobs equivalent to those at the M11 to M14 steps above-mentioned are executed. The temperature is measured, and comparison between the measured temperature and the preset temperature is made. Because the measured temperature exceeds over the preset temperature in this example, the program is proceeded to the M24 step. At the M24 step, 0 is written into the R8 bit of the instruction output register 107, thereby to stop supplying the microwave, and the program is returned to the L11 step. The program is accordingly proceeded to the L4 step through the L1 and L2 steps. At the L4 step, 0 is written into the CK and BL areas in the RAM 104, as preparatory procedures for indicating TIMER, and the BCD code corresponding to 4 is written into the DP area.

Thereafter, the program is circulated within the L6 to L11 steps and the L1, L2, L4 and L6 steps. In the course of this circulation, the contents of the TIMEB area in the RAM 104, namely, the remaining preset period of time of the timer, are indicated.

When the second signal is then produced, the program is entered into the [RUN2] routine at the L10 step. Through the M1, M2 and M3 steps of this [RUN2] routine, the program is proceeded to the M4 step. At the M4 step, 1 is subtracted from the contents of the TIMEB area in the RAM 104 and the timer counting is executed. The program is then proceeded to the M5, M6 and M19 to M22 steps. When the measured temperature is higher than the preset temperature, the program is proceeded to the M24 step, and when lower, the program is proceeded to the M23 step. As already mentioned, the microwave is stopped being supplied at the M24 step, and the microwave is started being supplied at the M23 step. The program is then proceeded to the L11 step.

Accordingly, while the program is repeated in the [RUN] routine, the remaining period of time is indicated at the indication portion 15 and every second in the [RUN2] routine the temperature is measured and the microwave is intermittently supplied in order to constantly maintain the temperature of food to be cooked, to the preset temperature.

When the remaining timer period of time becomes then 0, it is detected at the M5 step of the [RUN2] routine, and the program is proceeded to the K5 step of the [START] routine. At the K5 step, 1 is written into the END area in the RAM 104 and the BCD code corresponding to 2 is written into the CNT3 area. The program is then proceeded to the K4 step. At this K4 step, 0 is written into the R8 bit of the instruction output register 107 and the microwave supply is stopped. Thereafter, the program is entered into the [RUN] routine through the K3 step. Through the L1, L2, L4, L6 and L7 steps of this [RUN] routine, the program is entered into the [Buzzer] routine at the L8 step.

As already mentioned, the buzzer circuit 45 produces a buzzer sound in the [Buzzer] routine. In this example, 2 has been written into the CNT3 area at the K5 step and the buzzer sound is therefore continued for 2 seconds. When the buzzer sound is finished, the program is entered into the A2 step of the [Initial] routine through the O6, O7 and O8 steps.

As already mentioned, at the A2 step the predetermined areas of the RAM 104 are cleared, and the program is proceeded to the A3 step. Thereafter, the program is circulated within the A4 and A5 steps, and in the course of this circulation, the current time is indicated on the indication portion 15.

With these sequences, a series of operations are completed. Namely, the cooking is automatically started at 5:40 for the cooking completion time of 6:00. When the temperature of food to be cooked reaches the preset temperature (100° F.), the operation is then switched to the 10-minute timer operation, during which the food to be cooked is maintained to the preset temperature above-mentioned. After these 10 minutes abovementioned have passed, the cooking is finished at about 6:00.

[Delay Time Operation Including Timer Operation]

When intending to finish the cooking at the time later than the current time, for example at 6:00, in the 10-minute timer operation mode, the DELAY START , 6 0 0 , TIMER , 1 0 0 0 and START keys are operated in this order at the operation portion 16.

In this case, the program is similarly entered into the [START KEY] routine, and further entered into the [DELAY START] routine through the G1, G2, G3, G5, G6 and G7 steps. In this routine, the program is proceeded to the N4 step through the N1, N2 and N3 steps.

At the N4 step, the contents of the DELAY TIME area in the RAM 104 are transferred to the accumulator, and the contents of the forth digit and the third digit of the TIME1 area are also transferred to the operating register 101 (Namely, the 10-second digit and 1-second digit are omitted). Then, the latter contents are subtracted from the former contents, thereby to be transferred to the accumulator. At the N5 step, the contents of the accumulator above-mentioned are transferred to the DELAY TIMEB area in the RAM 104. Namely, the signal representing the cooking starting time of 5:50 is thus being set into this DELAY TIMEB area.

Thereafter, the program is entered into the [RUN] routine through the K4 and K3 steps of the [START] routine. In the course of the repetition in this routine, the current time is indicated and comparison between the current time and the cooking starting time is made every second at the M7 step of the [RUN2] routine. When the cooking starting time has come, the program is entered into the [Buzzer] routine, where a buzzer sound is generated for one second. Through the O8, O9 and O10 steps of this routine, the program is then proceeded to the G3 step of the [START KEY] routine. Through the G3, G5, G6 and G7 steps, the program is proceeded to the [START] routine. At the K2 step of the [START] routine, the microwave is started being supplied.

Thereafter, the program is repeated in the [RUN] routine. In this course, the remaining timer preset period of time is indicated and the timer preset period of time is counted every second at the [RUN2] routine.

When the timer preset period of time has passed, the program is proceeded to the K5 step of the [START] routine from the M5 step of the [RUN2] routine. At the K5 step, the microwave is stopped being supplied, and the program is then returned to the [RUN] routine and then entered into the [Buzzer] routine at the L8 step. After the buzzer sound has generated for 2 seconds at the [Buzzer] routine, the program is returned from the O8 step of the [Buzzer] routine to the [Initial] routine.

With these sequences, a series of operations are completed. Namely, the cooking is automatically started at 5:50 for the cooking completion time of 6:00, and then finished just at 6:00.

Delay Time Operation Including Temperature Operation]

When intending to finish the cooking at the time later than the current time, for example at 6:00, in the temperature operation mode where food to be cooked is heated to 100° F., [DELAY START], [6][0][0], [TEMP], [1][0][0] and [START] keys are operated in this order at the operation portion.

In such a case, the program is similarly proceeded to the [START KEY] routine. Through the G1, G2, G3, G4, G8, G9 and G10 steps of this routine, the program is entered into the [DELAY START] routine. At this routine, the program is proceeded to the N7 step through the N1, N2, N3 and N6 steps. At the N7 step, the contents of the DELAY TIME area in the RAM 104 are read out on the accumulator and the BCD code corresponding to 10 minutes is read out on the operating register 101. Then, the latter is subtracted from the former, and thus subtracted result is transferred to the accumulator. At the subsequent N5 step, the contents of the accumulator above-mentioned are transferred to the DELAY TIMEB area. Namely, the signal representing the cooking starting time of 5:50 is thus set into the DELAY TIMEB area. It is to be noted that the temperature operation is regarded as the operation of a fixed period of time of 10 minutes.

Thereafter, the program is proceeded to the [RUN] routine through the K4 and K3 steps of the [START] routine. In the course of the repetition in this routine, the current time is indicated and comparison between the current time and the cooking starting time is made every second at M7 step of the [RUN2] routine.

When the cooking starting time has come, the program is entered into the [Buzzer] routine where the buzzer sound is generated for one second. Through the O8, O9 and 010 steps of this [Buzzer] routine, the program is proceeded to the G3 step of the [START KEY] routine. Through the G4, G8 and G9 steps, the program is then proceeded to the [START] routine. At the K2 step of this routine, the microwave is started being supplied.

Thereafter, the program is repeated in the [RUN] routine. In the course of this repetition, the measured temperature is indicated, and at the [RUN2] routine every second the temperature is measured and comparison between the measured temperature and the preset temperature is made.

When the measured temperature reaches the preset temperature, the program is proceeded to the K5 step of the [START] routine from the M14 step of the [RUN2] routine through the M15 and M16 steps. At the K5 step, the microwave is stopped being supplied and the program is then returned to the [RUN] routine. At the L8 step of this routine, the program is entered into the [Buzzer] routine. After the buzzer sound has been generated for 2 seconds in the [Buzzer] routine, the program is returned to the [Initial] routine from the O8 step of the [Buzzer] routine.

With these sequences, a series of operations are completed. Namely, the cooking is automatically started at 5:50 for the cooking completion time of 6:00, and when the temperature of the food to be cooked reaches the preset temperature of 100° F., namely substantially at 6:00, the cooking is completed.

[Timer Operation]

When merely intending to operate the apparatus, for example for 10 minutes, it is enough to operate the keys of [TIMER], [1][0][0][0] and [START] in this order at the operation portion 16. The operation in such a case is now apparent.

[Temperature Operation]

When merely intending to heat food, for example to 100° F., it is enough to operate the keys of [TEMP], [1][0][0], and [START] in this order at the operation portion 16. The operation in such a case is now apparent.

[Timer Operation and Temperature Operation]

When intending to maintain food, for example to 100° F. for 10 minutes, the keys of either [TIMER], [1][0][0][0], [TEMP], [1][0][0] and [START], or TEMP , 1 0 0 , TIMER , 1 0 0 0 and START , are operated in this order. The operation in such a case is now apparent.

[Part-Way Stop]

When intending to stop any of various operations abovementioned on the way in the course of the supply of the microwave, the STOP key is operated at the operation portion 16. Namely, this key operation is detected at the L11 step of the [RUN] routine and the program is proceeded to the A6 step of the [Initial] routine and then to the A13 step. At this A13 step, the program is entered into the E1 step of the [STOP KEY] routine (FIG. 12, E). At the E1 step, by referring to the BSY area in the RAM 104, it is informed that the operation is now being conducted, and the program is proceeded to the E2 step. Because the DLYB area in the RAM 104 is 0 at this time, the program is proceeded to the E3 step. At This E3 step, 1 is written into the INT area in the RAM 104 and 0 is written into the R8 bit of the instruction output register 107 at the E4 step. Thereafter, the program is proceeded to the L1 step of the [RUN] routine.

At the L7 step of the [RUN] routine, by referring to the fact that the INT area in the RAM 104 is 1, the program is proceeded to the L11 step. Thereafter, the program is circulated within the L1, L2 and L4 steps or the L5, L6, L7 and L11 steps of the [RUN] routine. Accordingly, neither timer counting nor temperature measurement is conducted at all during this time, and the supply of microwave is also stopped.

It is now apparent that in order to re-start the operation from such a status, the START key is operated at the operation portion 16, so that this key operation is detected at the L11 step, and the program is then proceeded to the [START KEY] routine, whereby the operation is restarted.

When the STOP key is operated during the delay time operation and before the cooking starting time has come, the program is immediately proceeded to the [RUN] routine at the E2 step of the [STOP KEY] routine. Accordingly, the INT area in the RAM 104 remains as preset to 0 and such key operation exerts no influence.

When the door 14 of the microwave oven is opened during the time the microwave is generated, it is detected at the L9 step and L12 step of the [RUN] routine, and the program is then transferred to the E3 step of the [STOP KEY] routine. Thereafter similar effect is therefore produced as that when the STOP key is operated.

The CLEAR key operation at the operation portion 16 is detected at the A10 step of the [Initial] routine. The program is then returned to the A2 step and all areas in the RAM 104 except clock concerned areas, are cleared.

As apparent from the description hereinbefore, the present invention practically permits the temperature operation at the time of delay time operation and also permits to combine the delay time operation and the temperature operation with the timer operation.

Furthermore, when the door of the present cooking apparatus is opened during the time the heating energy is supplied, the supply of such heating energy is stopped, thereby to provide a safety status. When the door of the present cooking apparatus is opened before the actual cooking starting time has come in the case of the automatic start operation such as the delay time operation, such door opening exerts no influence upon the automatic start operation. It is therefore not necessary to give a re-starting instruction each time the door is subsequently closed, thereby to eliminate troublesome operations and to ensure the automatic starting, avoiding non-execution of the automatic starting due to failure of giving the re-starting instruction. As a matter of fact, even if the door is opened before the actual cooking time has come and an unnecessary re-starting instruction is given by mistake simultaneously with closing the door, such instruction is processed as invalid, thereby to prevent erroneous operation of the control member.

When the actual cooking starting time has come in the case of the automatic start operation such as the delay time operation, the notifying means such as a sound producing member is operated, simultaneously with the cooking start. It is therefore possible for the operator to be aware of the cooking start, even though the operator is away from the present cooking apparatus or the operator is not always watching the present cooking apparatus. It is thus avoided that the cooking is executed with the operator being absent, whereby a safety situation is provided and the opportunity for applying suitable treatment to food during the cooking cannot be missed.

What is claimed is:

1. An electronically controlled cooking apparatus comprising:
   heating energy supply means;
   control means for controlling said heating energy supply means; said control means including
   information input means for determining the operation of said control means, said information input means having defined therein a fixed average cooking time period and including means for setting a cooking completion time, means for setting a cooking temperature for the food to be cooked, means for cutting a user determinable auxiliary time period, and means for sensing the temperature of the food to be cooked and for supplying the temperature to said information input means, said information input means operating said control means to cause said heating energy supply means to start supplying energy at a cooking start time which is the cooking completion time minus the sum of the auxiliary time and said fixed average cooking time period and to continue supplying energy until the food has reached the set cooking temperature.

2. An electronically controlled cooking apparatus comprising:
   means defining a cooking chamber having an opening;
   a door for opening and closing said cooking chamber opening;
   a temperature sensor for detecting the temperature of food to be cooked in said cooking chamber;
   heating energy supply means;
   control means for controlling said heating energy supply means; said control means including
   information input means for determining the operation of said control means, said information input means receiving the output of said temperature sensor, said information input means also having defined therein a fixed average cooking time period and including means for setting a cooking completion time, means for setting a cooking temperature for the food to be cooked and means for setting a user determinable auxiliary time period, said information input means operating said control means to first cause said heating energy supply means to start supplying energy at a cooking start time which is the cooking completion time minus the sum of the auxiliary time and said fixed average cooking time period, then to control said heating energy supply means until the output from the temperature sensor corresponds to the preset cooking temperature for the food to be cooked, and then to operate said heating energy supply to maintain the food to be cooked at a warm temperature.

3. An electronically controlled cooking apparatus as in claim 2 wherein said control means includes microprocessor means.

4. An electronically controlled cooking apparatus as set forth in claim 3, further comprising an analog/digital (A/D) converter, through which the output of said temperature sensor is supplied to said microprocessor means.

5. An electronically controlled cooking apparatus as in claim 2 further comprising:
  detection means for detecting the opening of said door; and
  said control means further including delay cycle interrupt means responsive to said detection means to:
  a. proceed with operation of said heating energy supply means as aforementioned if said door is opened and shut prior to said cooking start time, without further input to said information input means, and
  b. to interrupt the operation of said heating energy supply means if said door is opened after said cooking start time.

6. An electronically controlled cooking apparatus as set forth in claim 5 further comprising:
  means for audibly notifying the user that a change of operational mode is imminent;
  said control means further including a cooking start time signalling means to cause said audible notifying means to operate just prior to said cooking start time, whereby the user will receive positive notification of said cooking start time.

7. An electronically controlled cooking apparatus comprising:
  means defining a cooking chamber having an opening;
  a door for opening and closing said opening;
  heating energy supply means for said chamber;
  numerical information display means;
  microprocessor means having a control portion, an arithmetic logic unit, a read only memory and a random access memory, said read only memory having a fixed average cooking time period stored therein;
  information input means for setting into said memory portion of said microprocessor internal temperature information of the food to be cooked, cooking completion time information and an auxiliary time period and for displaying at least said completion time on said display means;
  a temperature sensor for supplying to said microprocessor information regarding the temperature of the food being cooked,
  said arithmetic logic unit of said microprocessor determining from the stored information a cooking start time which is the cooking completion time minus the sum of the fixed average cooking time period and said auxiliary time period,
  said control portion of said microprocessor supplying a start signal to said heating energy supply means at said cooking start time,
  said arithmetic logic unit of the microprocessor determining if the temperature of the food being cooked as sensed by said temperature sensor means corresponds to the temperature as set by said input means,
  and said control portion of said microprocessor controlling said heating energy supply means to keep the temperature of the food to be cooked at a warm temperature during the auxiliary time period.

8. An electronically controlled cooking apparatus as in claim 7 wherein said microprocessor further includes clock means for generating a real time signal, and means for comparing the cooking starting time with the real time signal and producing said start signal.

9. An electronically controlled cooking apparatus as set forth in claim 7, further comprising an analog/digital (A/D) converter, through which the output of said temperature sensor is supplied to said microprocessor.

10. An electronically controlled cooking apparatus comprising:
  means defining a cooking chamber having an opening;
  a door for opening and closing said opening;
  detection means for detecting the opening and closing of said door;
  heating energy supply means;
  control means for controlling said heating energy supply means, said control means including cooking completion time setting means which operates to cause said heating energy supply means to start supplying energy at a suitable cooking start time to complete cooking at approximately said cooking completion time;
  said control means further including delay cycle interrupt means responsive to said detection means, for:
  a. starting the supply of energy from said heating energy supply means at said cooking start time after detecting the opening and closing of the door prior to the start of said cooking start time, without further input to said control means, and
  b. to stop said heating energy supply means from supplying energy upon detection of said door being opened after said cooking start time.

11. An electronically controlled cooking apparatus as in claim 10 further comprising means for issuing a reoperating instruction to said control means to cause said heating energy supply means to continue supplying energy after said detection means has sensed the opening and closing of said door after the cooking start time.

12. An electronically controlled cooking apparatus comprising:
  means defining a cooking chamber having an opening;
  a door for opening and closing said opening;
  detection means for detecting the opening of said door;
  heating energy supply means;
  control means for controlling said heating energy supply means, said control means including information input means for determining the operation of said control means, said information input means having defined therein a fixed average cooking time period and including means for setting a cooking completion time, means for setting a cooking temperature for the food to be cooked, and means for setting a user determinable auxiliary time period, said information input means operating to cause said heating energy supply means to start supplying energy at a cooking start time which is the cooking completion time minus the sum of the auxiliary time and said fixed average cooking time period;

said control means further including delay cycle interrupt means responsive to said detection means for:

a. starting the supply of energy from said heating energy supply means at said cooking start time after detecting the opening and closing of the door prior to the start of said cooking start time, without further input to said information input means, and b. to stop said heating energy supply means from supplying energy upon detection of said door being opened after said cooking start time.

13. An electronically controlled cooking apparatus as set forth in claim 12 further comprising:

a re-operation instruction means for issuing a re-operating instruction to said control means to cause said heating energy supply means to continue supplying energy after said detection means has sensed the opening and closing of said door after the cooking start time.

14. An electronically controlled cooking apparatus comprising:

heating energy supply means;

means for controlling the operation of said heating energy supply means including means for setting a cooking start time at which the control means is to operate said heating energy supply means to supply energy to the food to be cooked;

audible notifying means for altering the user that a change of operational mode of the operation of said heating energy supply means, to supply energy to food to be cooked, is imminent;

detection means for detecting a signalling time which is just prior to said cooking start time, said control means responding to the output of said detection means upon detection of said signalling time to actuate said audible notifying means for a period of time, whereby the user will receive positive notification of said cooking start time.

15. An electronically controlled cooking apparatus comprising:

means defining a cooking chamber;

heating energy supply means;

means for setting a desired cooking completion time;

control means for starting said heating energy supply means at a suitable cooking start time to complete a cooking process near said cooking completion time;

audible notifying means for alerting the user that a change of operational mode for said energy supply means is imminent;

said control means further including a cooking start time signaling means to cause said notifying means to operate just prior to said cooking start time, whereby the user will receive positive notification of said cooking start time.

16. An electronically controlled cooking apparatus comprising:

means defining a cooking chamber;

heating energy supply means for said chamber;

numerical information display means;

microprocessor means including a memory portion for starting said heating energy supply means at a suitable cooking start time to complete a cooking process near a desired preset cooking completion time;

information input means for setting into said memory portion of said microprocessor said cooking completion time information, and for displaying at least said completion time on said display means;

means for audibly notifying the user that a change in the operational mode of said heating energy supply means is imminent;

said microprocessor supplying a start signal to said heating energy supply means at said cooking start time and for actuating said alerting means just prior to said cooking start time, whereby the user will receive positive notification of said cooking start time.

17. An electronically controlled cooking apparatus comprising:

heating energy supply means;

control means for controlling said heating energy supply means; said control means including information input means for determining the operation of said control means, said information input means including means for setting a cooking completion time, means for setting a cooking temperature for the food to be cooked, and means for setting a user determinable time period, said control means further comprising means for starting said heating energy supply means at a cooking start time which is the cooking completion time minus the user determinable time period, and operating said heating energy supply means at least until the food to be cooked reaches said preset cooking temperature.

18. An electronically controlled cooking apparatus as in claim 2, wherein after the food has reached the preset cooking temperature, said control means operates said heating energy supply means to maintain the temperature of the food to be cooked at a warm temperature for a period of time equal to said auxiliary time.

19. An electronically controlled cooking apparatus as in claim 18, wherein after the food has reached the preset cooking temperature, said control means operates said heating energy supply means to maintain the temperature of the food to be cooked at the preset cooking temperature, according to the output of said temperature sensor.

* * * * *

UNITED STATES PATENT AND TRADEMARK OFFICE
CERTIFICATE OF CORRECTION

PATENT NO. : 4,378,487
DATED : March 29, 1983
INVENTOR(S) : Masahiko Maeda

It is certified that error appears in the above-identified patent and that said Letters Patent are hereby corrected as shown below:

Column 30, line 38, change "cutting" to --setting--.

Signed and Sealed this

Twenty-eighth Day of June 1983

[SEAL]

Attest:

GERALD J. MOSSINGHOFF

Attesting Officer    Commissioner of Patents and Trademarks